(12) United States Patent
Lee et al.

(10) Patent No.: US 9,342,413 B2
(45) Date of Patent: May 17, 2016

(54) SAS RAID HEAD

(75) Inventors: Cheng-Yu Lee, Chung-Ho (TW);
Chung-Hua Pao, Jhonghe (TW);
Ching-Hua Fang, Taipei (TW)

(73) Assignee: INFORTREND TECHNOLOGY, INC., Chung-Ho, Taipei Hsien (TW)

( * ) Notice: Subject to any disclaimer, the term of this patent is extended or adjusted under 35 U.S.C. 154(b) by 0 days.

(21) Appl. No.: 11/740,395

(22) Filed: Apr. 26, 2007

(65) Prior Publication Data

US 2007/0255900 A1  Nov. 1, 2007

Related U.S. Application Data

(60) Provisional application No. 60/745,752, filed on Apr. 27, 2006.

(51) Int. Cl.
*G06F 13/00* (2006.01)
*G06F 11/20* (2006.01)
*G06F 3/06* (2006.01)

(52) U.S. Cl.
CPC ............ *G06F 11/201* (2013.01); *G06F 3/0617* (2013.01); *G06F 3/0635* (2013.01); *G06F 3/0658* (2013.01); *G06F 3/0664* (2013.01); *G06F 3/0689* (2013.01); *G06F 11/2089* (2013.01)

(58) Field of Classification Search
CPC ... G06F 3/0689; G06F 3/0617; G06F 11/201; G06F 3/0658; G06F 11/2089
USPC ............................... 711/157, 114; 710/74, 30
See application file for complete search history.

(56) References Cited

U.S. PATENT DOCUMENTS

| 5,987,566 | A  | * | 11/1999 | Vishlitzky et al. ............ 711/114 |
| 6,931,487 | B2 | * | 8/2005  | Lubbers et al. ............... 711/114 |
| 7,251,701 | B2 | * | 7/2007  | Chikusa et al. ................. 710/74 |
| 7,266,706 | B2 | * | 9/2007  | Brown et al. ................ 714/6.32 |
| 7,269,674 | B2 | * | 9/2007  | Chikusa et al. ................. 710/74 |
| 7,689,736 | B2 | * | 3/2010  | Kalwitz .......................... 710/31 |
| 7,743,178 | B2 | * | 6/2010  | Warren et al. .................. 710/30 |
| 2002/0199048 | A1 | * | 12/2002 | Rabinovitz .................... 710/100 |
| 2003/0115413 | A1 | * | 6/2003  | Wood et al. .................... 711/114 |
| 2003/0193776 | A1 | * | 10/2003 | Bicknell et al. ............... 361/685 |
| 2004/0177218 | A1 | * | 9/2004  | Meehan et al. ............... 711/114 |
| 2005/0005062 | A1 | * | 1/2005  | Liu et al. ....................... 711/112 |
| 2005/0005063 | A1 | * | 1/2005  | Liu et al. ....................... 711/112 |
| 2005/0015545 | A1 | * | 1/2005  | Liu et al. ....................... 711/114 |
| 2006/0048001 | A1 | * | 3/2006  | Honda et al. ....................... 714/7 |
| 2007/0165660 | A1 | * | 7/2007  | Fang .................... G06F 11/201 370/410 |
| 2007/0233916 | A1 | * | 10/2007 | Seto ............................. 710/100 |

* cited by examiner

*Primary Examiner* — Ernest Unelus
(74) *Attorney, Agent, or Firm* — Muncy, Geissler, Olds & Lowe, P.C.

(57) ABSTRACT

An SAS RAID head is provided to connect between at least one initiator and at least one storage device. It is a connection head possessed of the RAID function. The SAS RAID head comprises at least one SVC (or a SVC pair), a cooling module, a power supply, and/or an enclosure for accommodating and fixing the above-mentioned components. Wherein, the device-side I/O device interconnect of the SVC (or SVC pair) is the SAS interface. The invention has the flexibility to vary the numbers of initiators and storage devices connected thereto in order to satisfy the topological structures of various systems.

58 Claims, 17 Drawing Sheets

SAS RAID HEAD

RELATED APPLICATIONS

This application claims priority to provisional patent application Ser. No. 60/745,752, filed Apr. 27, 2006, and entitled "SAS RAID HEAD", which is incorporated herein by reference.

BACKGROUND OF THE INVENTION

1. Field of Invention

The invention relates to a redundant array of independent disk (RAID) head and, in particular, to a serial-attached SCSI (SAS) RAID head.

2. Related Art

Storage virtualization is a technology of virtualizing physical storage space. Different sections of the physical storage devices (PSDs) are combined into a logical storage entity accessible by a host system. This logical storage entity here is called a logical media unit (LMU). The technology is mainly used in storage virtualization of the redundant array of independent disk (RAID). Using this RAID technology, smaller physical storage devices can be combined into LMUs with a larger capacity, better fault tolerance, and higher efficiency.

A storage virtualization subsystem (SVS) or a RAID subsystem in the field of RAID is a subsystem that implements the above-mentioned storage virtualization technology. It can use an I/O interface to connect to an external host system, forming a storage virtualization system. The primary components in the subsystem include at least a storage virtualization controller (SVC), a plurality of physical storage devices (PSDs), and related devices such as the backplane, power supply, and heat dissipation element.

The SVC is the kernel element for implementing the storage virtualization technology. Sections of the physical storage media are combined and mapped by the SVC to form a LMU visible to a host system. The SVC receives an I/O request sent out by the host system, and analyzes and converts it into the I/O request of the PSD (e.g., a hard disk drive). The data stored in the PSD can thus be used by the host system.

The SVC connected to the host system via an I/O interface is an external (or stand-alone) SVC. It can be connected to an external device of the host system. Generally speaking, the external SVC operates independent of the host.

The external (or stand-alone) direct-access RAID controller is an example of the external SVC. The RAID controller combines sections of one or multiple physical direct access storage devices (DASDs) to form LMUs. How they are combined is determined by the adopted specific RAID level. The LMUs thus formed have continuous addresses for the host system, so that each LMU can be utilized. Typically, a single RAID controller can support various RAID levels. Therefore, different LMUs can be formed by combining various sections of the PSDs using different RAID levels in different ways. The different LMUs thus formed have the properties of the corresponding RAID levels.

Another example of the external SVC is the JBOD emulation controller, which stands for "Just a Bunch of Drives." It is a set of physical DASDs directly connected to a host system via one or several multiple-device I/O device interconnect channels. As to an intelligent JBOD emulation device, it can be used to emulates several multiple-device I/O device interconnect DASDs by mapping I/O requests to the physical DASDs that are connected to the JBOD emulation device individually via I/O device interconnect channels.

The primary functions of the SVC are to manage, combine, and manipulate PSDs in such a way as to present them as a set of LMUs to the host. To the host, each of the LMUs is presented as if it were a directly-connected PSD of which the LMU is supposed to be the logical equivalent. In order to accomplish this, I/O requests sent out by the host to be processed by the SVC that will normally generate certain behavior in an equivalent PSD also generate logically equivalent behavior on the related part of the LMU addressed by the SVC. The result is that the host considers it as directly connecting to a PSD and communicating with it, although in fact, the host is connected to the SVC that is simply emulating the behavior of the PSD of which the addressed LMU is the logical equivalent.

The backplane is a printed circuit board (PCB) connected to the SVC for providing power and communication links. It also has non-volatile storage media and other passive components. Another function of the backplane is to fix the relative positions of devices such as the SVC in the enclosure.

In general, the SVC, the PSD (e.g., a hard disk drive), and such devices as the backplane, power supply, and heat dissipation element are integrated in an enclosure, forming an independent SVS. According to different needs, there can be different numbers of SVCs and PSDs (e.g., hard disk drives) inside the enclosure. For example, a storage virtualization subsystem configured with a single SVC is a simple and cost-effective design; however, it does not have the capability of fault tolerance. That is, when one controller malfunctions, no backup controller can take over its jobs (called "failover") so that the storage virtualization subsystem can continue its normal operations. Therefore, it is common to configure two SVCs to form a SVC pair, thereby achieving the function of fault tolerance. Besides, the storage virtualization subsystems on the market also provide several options in the number of PSDs (e.g., hard disk drives), depending upon the storage capacity, size, and cost. For example, when more PSDs are equipped in the enclosure, it means that the storage virtualization subsystem can provide a larger storage capacity, along with the drawbacks of a larger size and a higher cost. On the other hand, having fewer PSDs (e.g., hard disk drives) can reduce the size of the enclosure and lower the cost. Of course, the storage space is relatively less in this case.

The exterior of the enclosure of the storage virtualization subsystem is provided with one to several interconnect ports. According to different objects of connection, their configurations can be set in the target mode or initial mode, thereby respectively connecting to the host or other external devices (e.g., another storage virtualization subsystem or JBOD). The number of the interconnect ports and their configurations on the enclosure of a storage virtualization subsystem are usually already determined according to different requirements before leaving the factory.

In order for the connection topology to be more flexible among the components of the SVC(s), the PSDs and the host of the storage virtualization system, a RAID head device is invented. In comparison with the storage virtualization subsystem, the RAID head is not built in with PSDs (e.g., hard disk drives). It only provides the SVC(s) for processing signals and the interconnect ports for connecting with external devices, in addition to other relative components such as a power supply and cooling modules. The RAID head can be said to be a connection head with computational ability, forming a bridge between the host and the PSDs.

Conventionally, the usual storage virtualization uses the parallel small computer system interface (P-SCSI) or fibre channel (FC) as the primary device-side I/O device interconnect, thereby connecting the PSDs to the SVC(s). Currently, there are RAID heads whose device sides are the FC.

The P-SCSI and the FC both are multiple-device I/O device interconnects. The bandwidth of such a multiple-device I/O device interconnect is shared by all hosts and all devices that they connect to. The multiple-device I/O device interconnect has the following drawback. If one device linked to the multiple-device interconnect fails or malfunctions, it may interfere with the connection and/or data transmissions between the host and the other devices which use the same interconnect. The fibre channel arbitrated loop (FC-AL) can practically reduce the above-mentioned worry to a certain extent because it provides a double-track redundant connection. The double-track redundant connection provides two channels for each device in case one of them is broken or blocked. However, such a design is still inferior in that each storage device has its own dedicated connection. This is because if the two channels independently fail, then both connections still cannot take effect. On the other hand, if dedicated connections are used, then it can be guaranteed that the signal integrity among the connections has its complete independence. In this case, if one of the devices is damaged, the others will not be affected.

Therefore, a dedicated point-to-point (P2P) I/O device interconnect called the serial attached SCSI (SAS) is developed. It can solve the above-mentioned intrinsic problem of the multiple-device I/O device interconnect, and provide a fast transmission speed. The SAS utilizes the verified advantages of the P-SCSI (its stable reliability as well as ample and mature command sets). Moreover, it uses a new serial structure to achieve an amazing transmission volume (3.0 Gbits/sec, 6.0 Gbits/sec, or more) and significant extensibility (up to 16384 devices using expander devices).

It is thus seen that a RAID head using SAS as its primary device-side I/O device interface has its importance in practice.

SUMMARY OF THE INVENTION

An objective of the invention is to provide a RAID head whose device-side I/O device interconnect is the serial attached SCSI (hereinafter as SAS). It provides a plurality of interconnect ports for flexible connections with different numbers of host systems and storage devices by selectively setting the ports in a target mode or an initial mode, suitable for various system connection topologies.

According to one feature of the invention, a SAS RAID head is disclosed, which has a plurality of interconnect ports for connecting to at least one initiator and at least one storage device. It includes: an SVC, which is coupled to the at least one initiator for executing at least one I/O operation in response to at least one I/O request sent from the at least one initiator; a cooling module, which is used to remove heat; and a power supply, which is coupled to the SVC and the cooling module for providing electricity. In particular, one device-side I/O device interconnect of the SVC is the serial-attached SCSI (SAS).

According to another feature of the invention, a SAS RAID head is disclosed, which provides a plurality of interconnect ports for connecting to at least one initiator and at least one storage device. It includes: an SVC pair consisting of a first SVC and a second SVC, which executes at least one I/O operation in response to at least one I/O request sent from the at least one initiator; a cooling module, which is used to remove heat; and a power supply, which is coupled to the SVC pair and the cooling module for providing electricity. In particular, one device-side I/O device interconnect of the SVC pair is the serial-attached SCSI (SAS).

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
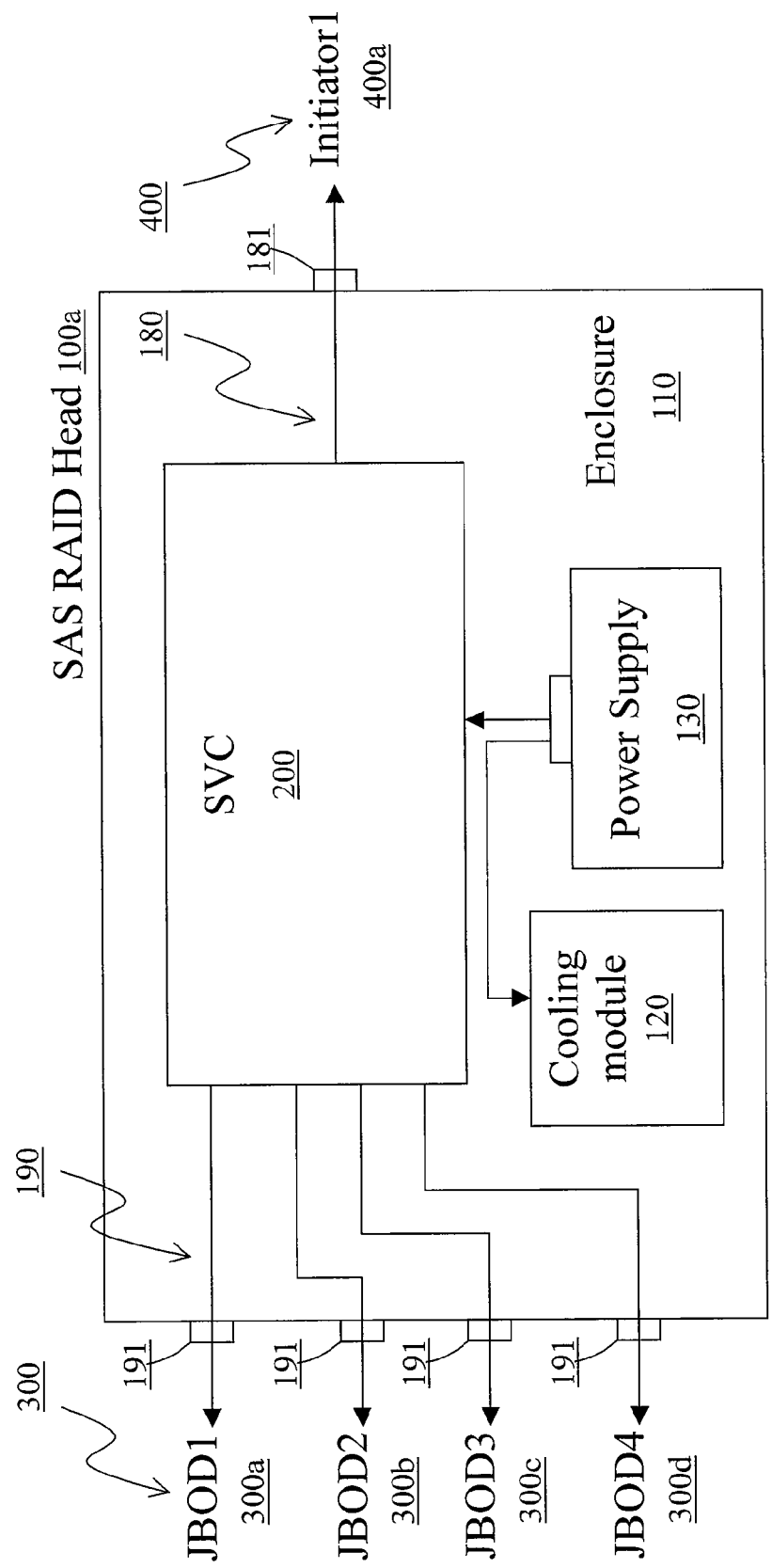
FIG. 1 shows the first embodiment of the disclosed SAS RAID head.

FIG. 1 shows the primary components and the basic structure of the disclosed device according to the first embodiment of the invention. FIG. 1 illustrates a RAID head 100a whose device side transmission interface is the serial attached SCSI (SAS), hereinafter as the SAS RAID head. It includes at least one storage virtualization controller (SVC) 200, a power supply unit, and a cooling module 120. An enclosure 110 can be further used to accommodate and fix these components. The cooling module 120 can be a fan or a heat sink for removing heat from the components (e.g., the SVC 200) inside the SAS RAID head 100. The power supply unit is used to supply electric power to the components (e.g., the SVC 200 and/or the cooling module 120) inside the SAS RAID head 100. The power supply unit shown in the drawing is inside the enclosure. It can be a power supply 130 or a battery (not shown). In another embodiment, the power supply unit can be a power adapter outside the enclosure. For convenience, all of the following drawings use the power supply 130 as the example for the power supply unit.

The SVC 200 is connected to the host 400 and the storage devices 300 via a host-side I/O device interconnect 180 and a device-side I/O device interconnect 190, respectively. The device-side I/O device interconnect 190 in the invention is an SAS I/O device interconnect 190. That is, the disclosed SVC 200 is an SAS SVC 200, compliant with the SAS protocol for I/O signal transmissions at the device side.

The enclosure 110 is disposed with a plurality of interconnect ports 181, 191 that are electrically coupled to the I/O device interconnect ports (not shown) on the SAS SVC 200. Using different configuration settings, the plurality of interconnect ports 181, 191 can separately be set as the device-side interconnect port 191 or the host-side interconnect port 181 for the connections with the storage devices 300 or the host system 400, respectively. The type of the device-side interconnect port 191 can be InfiniBand. The type of the host-side interconnect port 181 can be InfiniBand, SFP (Small Form Plugable), or some other types, depending on whether the transmission interface of the host-side I/O device interconnect 180 is the SAS, Fibre Channel (FC), Small Computer System Interface (SCSI), or some other types of transmission interfaces. Besides, according to the feature of the invention, the enclosure 110 in the following embodiments does not accommodate any storage devices 300 (e.g., hard disk drives) for storing pay-load data. Any such storage device 300 is connected to the exterior of the enclosure 110 via the device-side interconnect port 191 thereon.

A backplane (not shown) can be further disposed between the SVC 200 and the interconnect ports 191, 181 to achieve electrical communication. The backplane is a printed circuit board (PCB), which can be used as a medium for supplying power and providing communication links. It is also disposed with nonvolatile storage media and other passive components. Besides, the backplane can also be used to fix the SVC 200 and the interconnect ports 191, 181.

The SAS RAID head 100a in FIG. 1 assumes that the host side has only the connection request from one initiator 400a. Therefore, the SVC 200 is directly connected to the initiator 400a via the host-side interconnect port 181. In practice, the initiator 400a can be a host computer, such as a server system, work station, personal computer system or other related computers, or even another SVC. Besides, one may also use one host computer disposed with two host bus adapters (HBA) (not shown) as two initiators. Alternatively, the two interconnect ports of an HBA can be two initiators as well.

Figure 2:
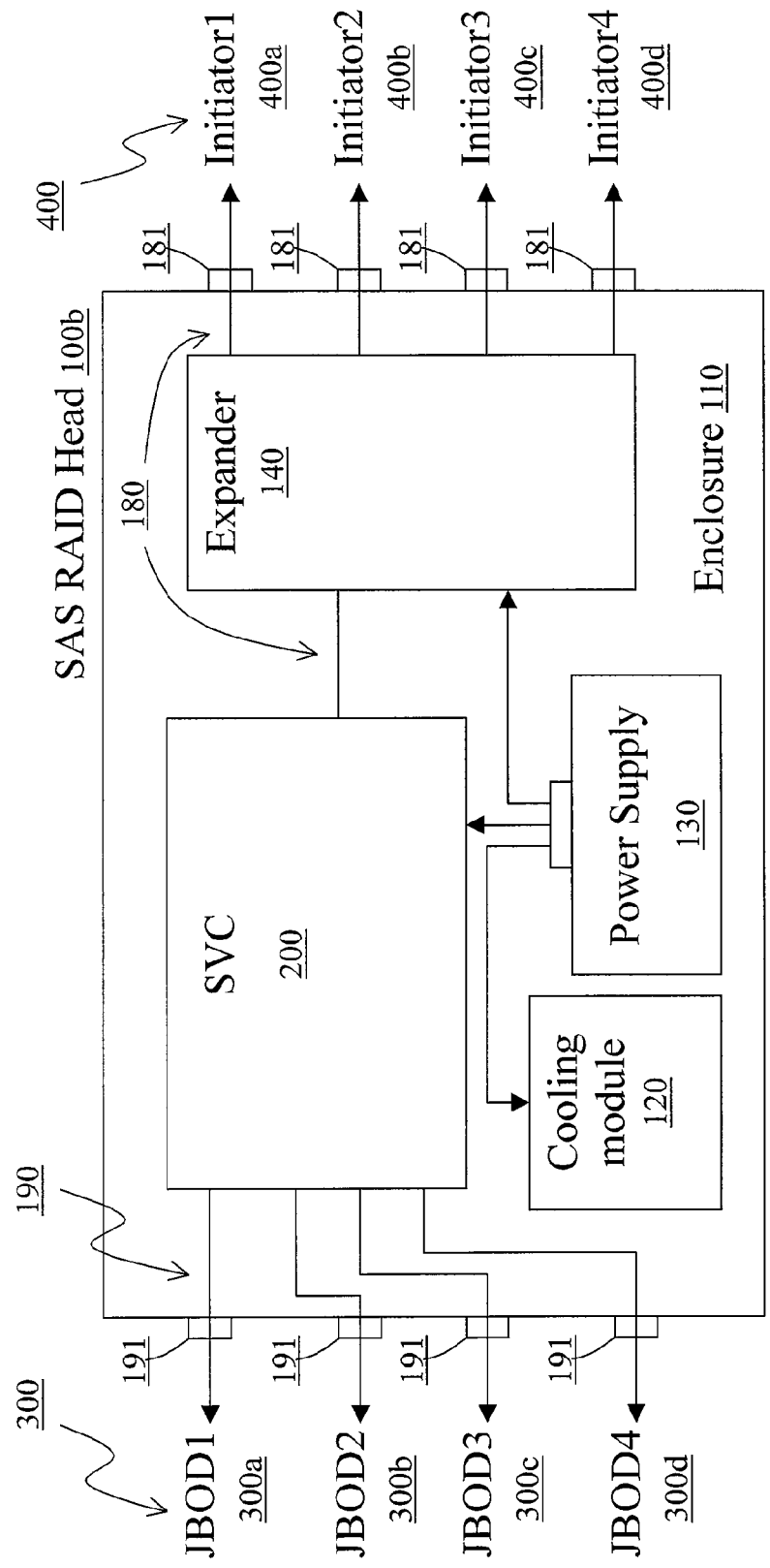
FIG. 2 shows the second embodiment of the disclosed SAS RAID head.
Figure 3:
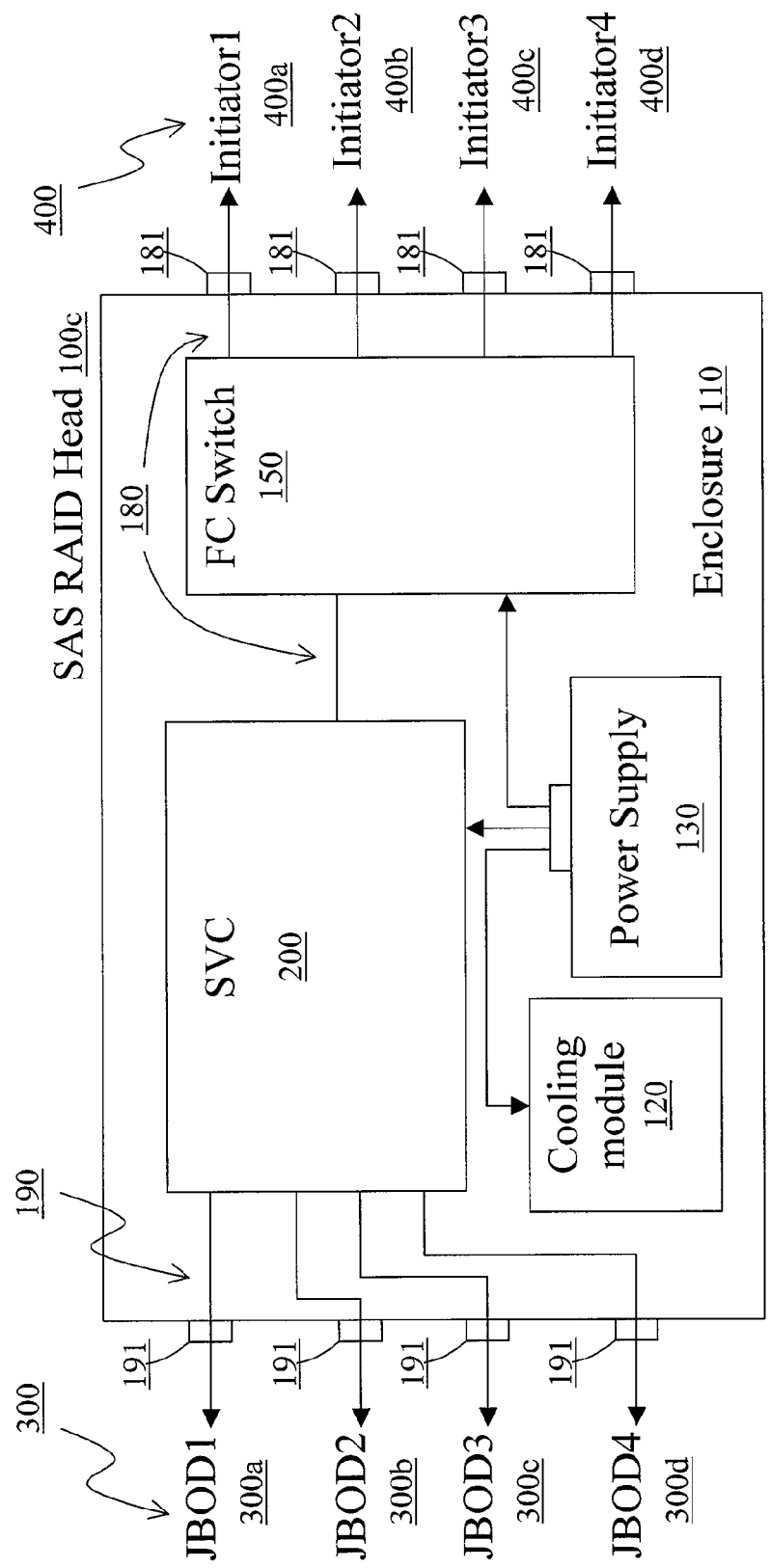
FIG. 3 shows the third embodiment of the disclosed SAS RAID head.
Figure 4:
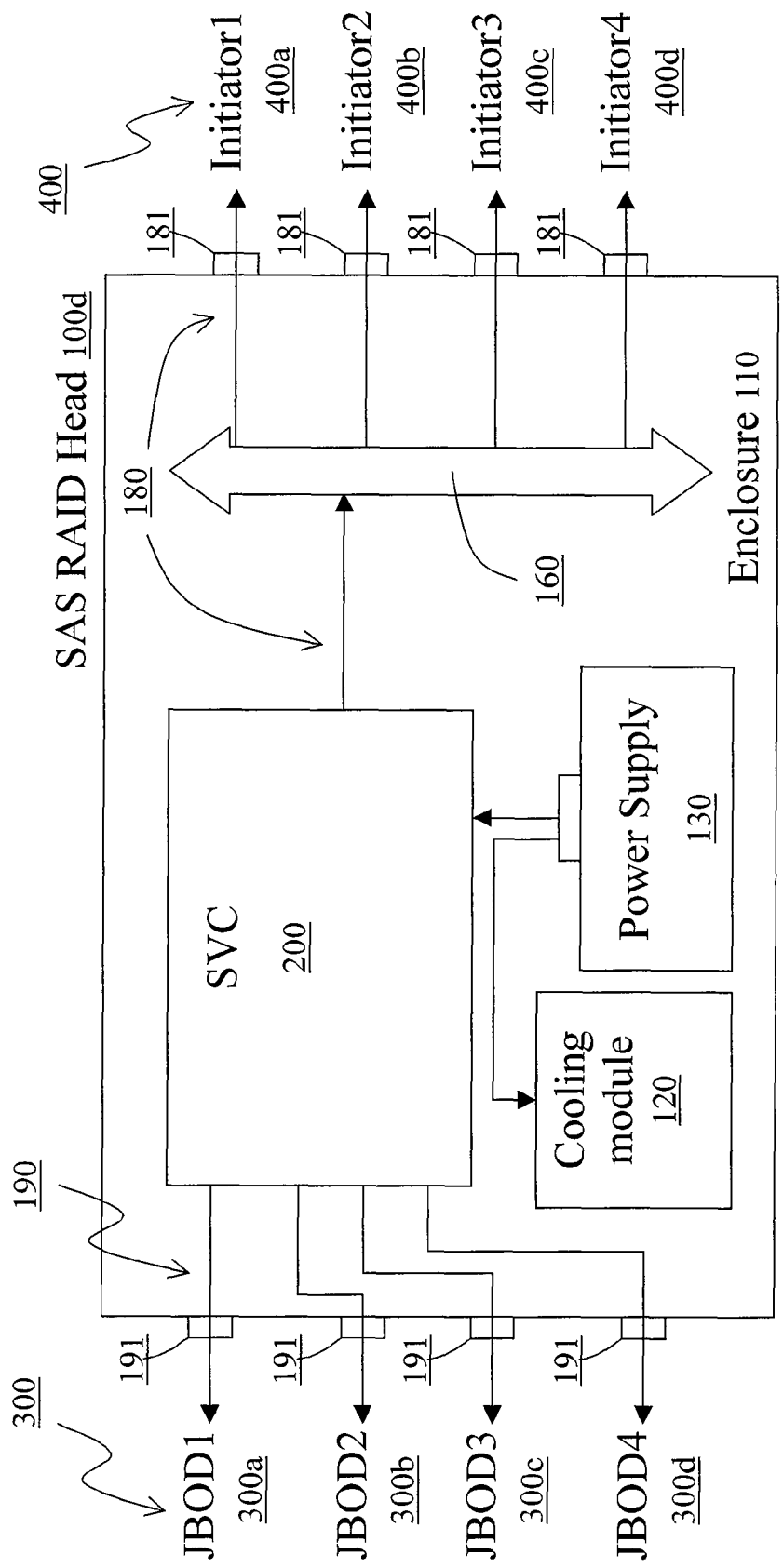
FIG. 4 shows the fourth embodiment of the disclosed SAS RAID head.

With reference to FIGS. 2 and 3, if the host 400 connected with the SAS RAID heads 100b, 100c has more than one initiator (e.g., there are four initiators 400a, 400b, 400c, 400d connected to the SAS RAID heads 100b, 100c in the drawings), then an expanding component can be inserted on the path of the host-side I/O device interconnect 180 and between the SVC 200 and the initiators 400a, 400b, 400c, 400d to achieve the goal of device extension. If the host-side I/O device interconnect 180 is an SAS interface, the expanding component can be an expander 140, as shown in FIG. 2. If the host-side I/O device interconnect 180 is an FC, then the expanding component can be an FC switch 150, as shown in FIG. 3. Otherwise, if the host-side I/O device interconnect 180 is an SCSI interface, then the SAS RAID head 100d can connect to multiple initiators 400a, 400b, 400c, 400d only via the SCSI bus 160, as shown in FIG. 4. The expander 140, the FC switch 150, and the SCSI bus 160 are well developed products and known to people skilled in the art. Therefore, their details are not further described hereinafter.

The storage devices 300 externally connected with the disclosed SAS RAID head 100 can be a JBOD (short for "just a bunch of drives"), a virtual storage system (e.g., a RAID, short for "Redundant Array of Independent Disk"), or a PSD (short for "Physical Storage Device") (e.g., a hard disk drive). The JBOD refers to a set of physical direct-access storage devices that are directly connected to the RAID head/subsystem or host via one or more multiple-device I/O device interconnect channels. For the convenience of illustration and simplifying the drawing, the storage devices 300 in the drawings uses, but does not limited to, the JBOD as an example. The number of the JBODs can be one to many, represented by JBOD1 300a, JBOD2 300b, JBOD3 300c, JBOD4 300d, etc. The storage devices 300 area plurality of direct access storage devices (e.g., hard disk drives) whether it is a JBOD or virtual storage system (e.g., a RAID). The direct access storage devices include both the following devices or one of them: SAS direct access storage devices and serial ATA (SATA) direct access storage devices.

The SVC 200 in the disclosed SAS RAID head 100 can be a RAID controller or a JBOD emulator. The SVC 200 receives I/O requests and the related data (e.g., control signals and data signals) from the host 400, and internally executes the I/O signals or maps them to the storage devices 300. From the viewpoint of the host 400, the SVC 200 can be used to enhance the efficiency and/or data availability and/or storage capacity of a single logical media unit (e.g., a logical disk drive).

Figure 5A:
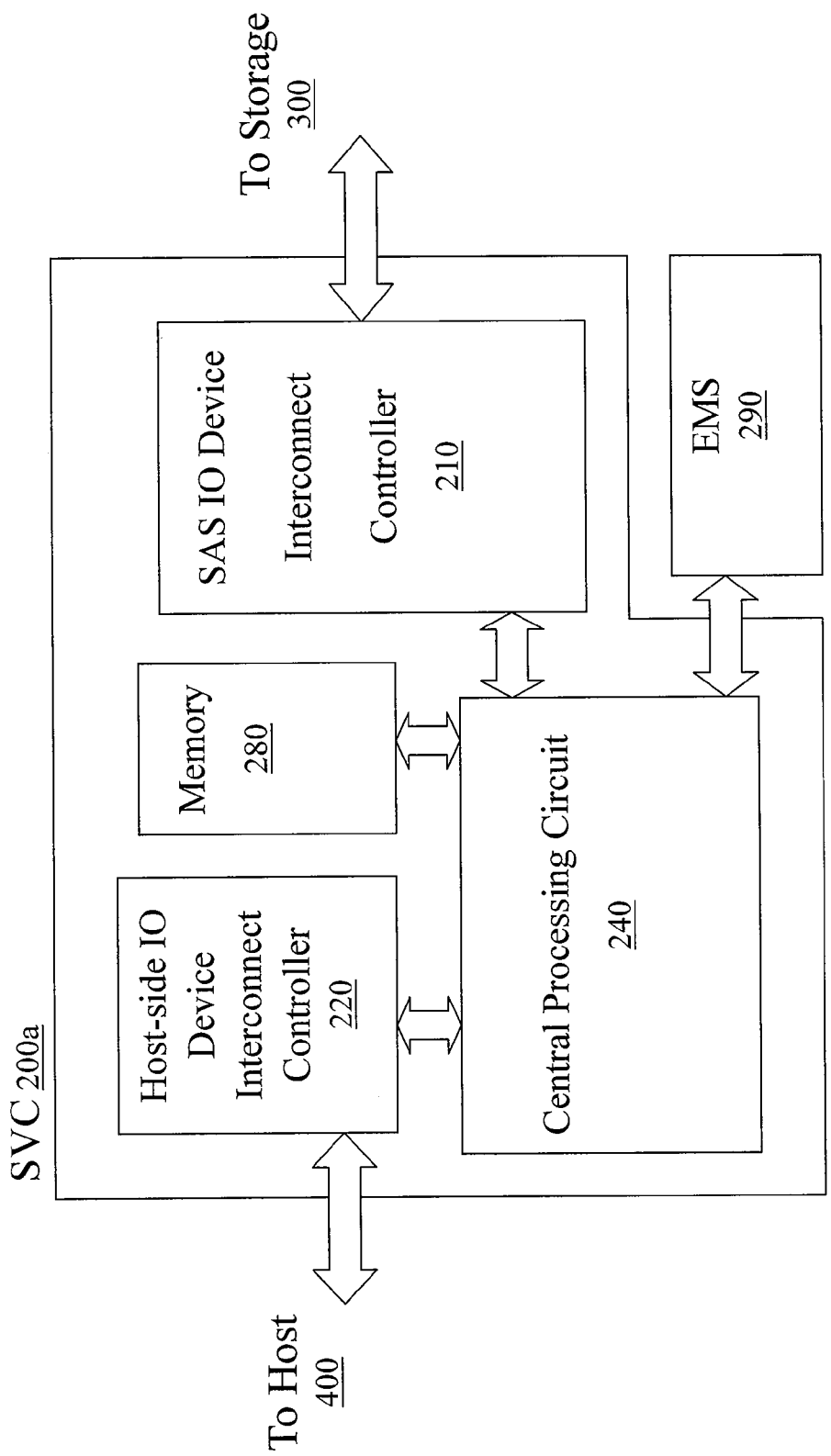
FIG. 5A shows the first embodiment of the SVC in the disclosed SAS RAID head.

FIG. 5A shows the block diagram of an embodiment of the SVC 200a according to the invention. It includes the connection relation with the host 400 and the storage devices 300. In this embodiment, the SVC 200 contains a host-side I/O device interconnect controller 220, a central processing circuit (CPC) 240, a memory 280, and an SAS I/O device interconnect controller 210. The SAS I/O device interconnect controller 210 can also be called a device-side I/O device interconnect controller. Although they are described as independent functional blocks, two or more or even all of the functional blocks can be integrated into a single chip in practice.

The host-side I/O device interconnect controller 220 inside the SVC 200 is connected to the CPC 240 and externally connected to the host 400 via a host-side I/O device interconnect port (not shown), or further via an expanding component such as an expander 140, or an FC switch 150 connected to the host 400. The host-side I/O device interconnect controller 220 is an interface and buffer between the SVC 200 and the host 400. It receives I/O requests and the related data transmitted from the host 400 and transfers them to the CPC 240 in order to convert and/or map the I/O requests and the related data.

When the CPC 240 receives an I/O request transmitted from the host 400 via the host-side I/O device interconnect controller 220, the CPC 240 analyzes the I/O request and executes some operations in response to the I/O request. The requested data and/or information are transmitted by the host-side I/O device interconnect controller 220 to the host 400.

After analyzing an I/O request from the host 400, if the received is a read request and one or more operations are performed as the response, the CPC 240 obtains the requested data from one or both the places of the interior of the CPC 240 and the memory 280, and transfers them to the host 400. If the requested data cannot be obtained from the interior or do not exist in the memory 280, then one or more I/O requests are sent via the SAS I/O device interconnect controller 210 to the storage devices 300. Afterwards, the requested data are transmitted from the storage devices 300 to the memory 280, followed by a further transfer from the host-side I/O device interconnect controller 220 to the host 400.

When a write request transmitted from the host 400 reaches the CPC 240, the CPC 240 receives data transmitted from the host 400 via the host-side I/O device interconnect controller 220 and stores them in the memory 280. When the SVC 200 receives the write request, it follows its own configuration to determine whether to "write back" or "write through" in response to the write request. For the "write back" operation, the I/O complete response is first transmitted to the host 400 and then the CPC 240 actually performs the writing operation. For the "write through" operation, the I/O complete response is transmitted to the host 400 after the data are actually written to the storage devices 300. For both "write back" and "write through" operations, data are transmitted via the CPC 240 to the storage devices 300.

The memory 280 is connected to the CPC 240 as a buffer to buffer the data transmitted through the CPC 240 between the host 400 and the storage devices 300. In an embodiment of the invention, the memory 280 can be a dynamic random access memory (DRAM). More explicitly, the DRAM can be synchronous dynamic random access memory (SDRAM).

The SAS I/O device interconnect controller 210 is a device-side I/O device interconnect controller. It is connected to the CPC 240 inside the SVC 200 and externally connected to the storage devices 300 via a device-side I/O device interconnect port (not shown). The device-side I/O device interconnect port in the invention is the SAS interconnect port. The storage device 300 can be a JBOD, a virtual storage system (e.g., a RAID), or a PSD (e.g., a hard disk drive). The SAS I/O device interconnect controller 210 is an interface and buffer between the SVC 200 and the storage devices 300. It receives the data and control signals sent from the CPC 240, re-formats them to comply with the SAS protocol, and sends them to the storage devices 300.

When the storage devices 300 receive the I/O request from the CPC 240 via the SAS I/O device interconnect controller 210, it performs several operations in response to the I/O request and sends the requested data and/or report and/or information to the CPC 240.

In this embodiment of the SVC 200, an enclosure management service (EMS) circuitry 290 can be further attached to the CPC 240 as a management circuitry for the cooling module and/or the power supply. Other embodiments of the invention may have different configurations. For example, the EMS circuitry 290 can be omitted or integrated in the CPC 240 according to different functional designs of the products.

Figure 5B:
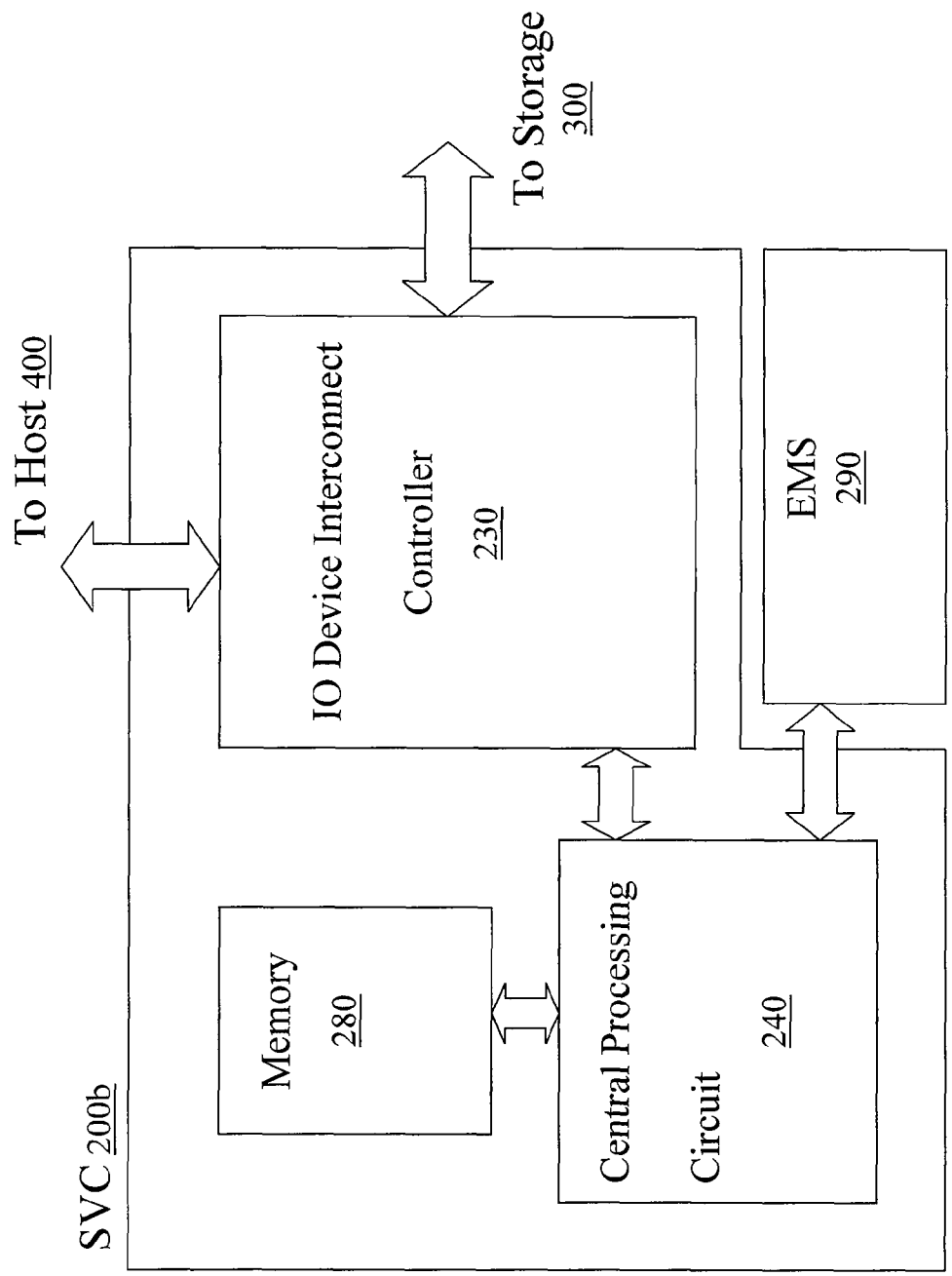
FIG. 5B shows the second embodiment of the SVC in the disclosed SAS RAID head.

With reference to FIG. 5B, the host-side I/O device interconnect controller 220 and the SAS I/O device interconnect controller 210 according to another embodiment of the disclosed SVC 200b can be integrated in one I/O device interconnect controller 230. The I/O device interconnect controller 230 provides several I/O interconnect ports (not shown). According to different configurations of the I/O device interconnect controller 230, it can provide interconnect ports for the storage devices 300 or host 400.

The I/O device interconnect controller 230 in FIG. 5B has to be able to process two kinds of I/O signals—the host-side I/O signal and the device-side I/O signal. That is, the I/O device interconnect controller 230 has both the functions possessed by the host-side I/O device interconnect controller 220 and the SAS I/O device interconnect controller 210. The I/O device interconnect controller 230 is connected to the CPC 240 inside the SVC 200a and externally connected to the host 400 or the storage devices 300, according to different configurations, via a plurality of I/O interconnect ports (not shown). For the configuration setting of the host-side I/O device interconnect port (not shown), the connection to the host 400 can also be achieved via an expander 140, FC switch 150, etc. For the configuration setting of the device-side I/O device interconnect port (not shown), it is the SAS interconnect port in the invention. The I/O device interconnect controller 230 is an interface and buffer between the SVC 200 and the host 400 and the storage devices 300. It receives an I/O request and the related data transmitted from the host 400 or the storage devices 300, and transmits them to the CPC 240 in order to convert and/or map the I/O request and the related data.

Figure 6A:
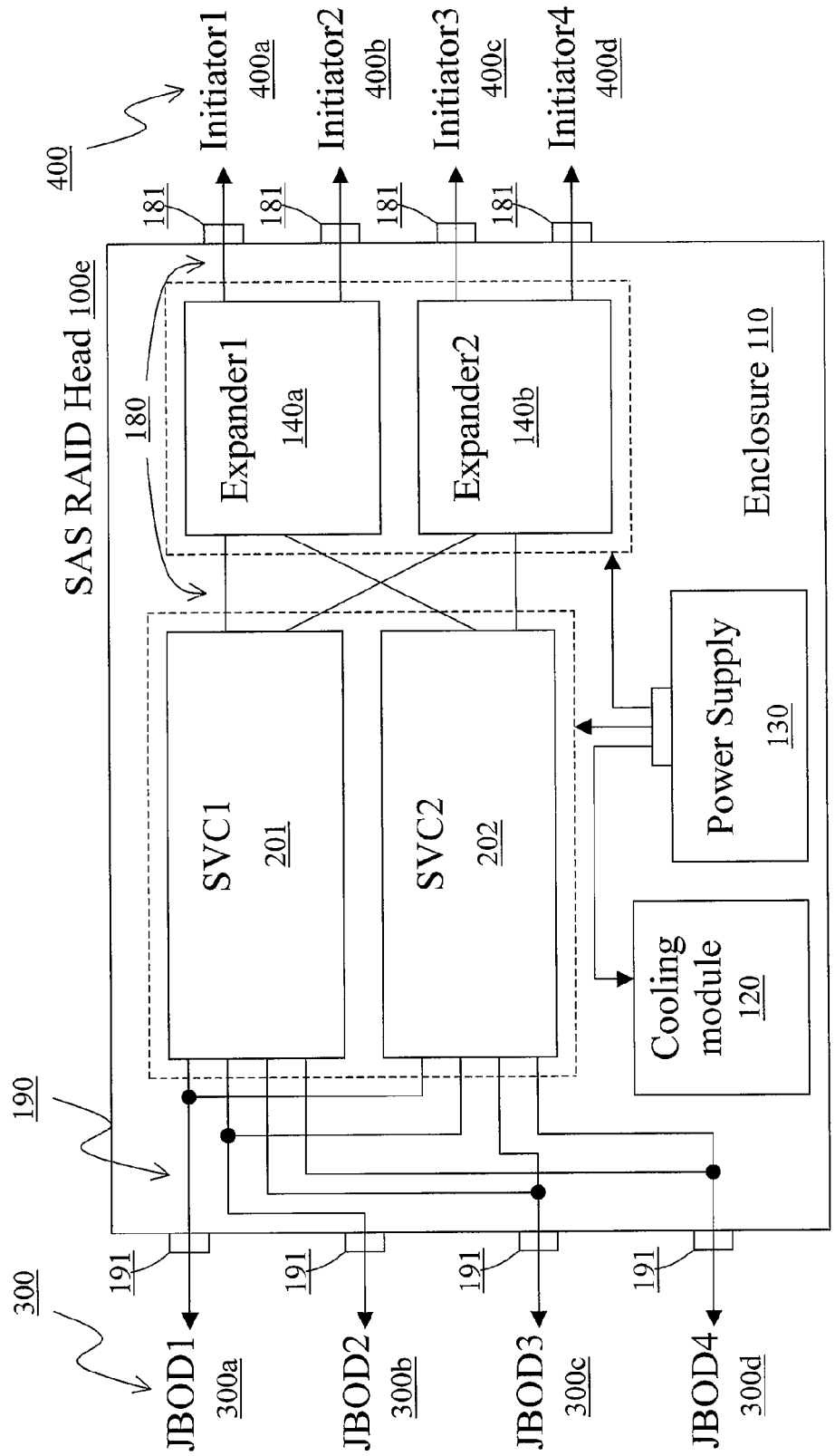
FIG. 6A shows the fifth embodiment of the disclosed SAS RAID head.
Figure 6B:
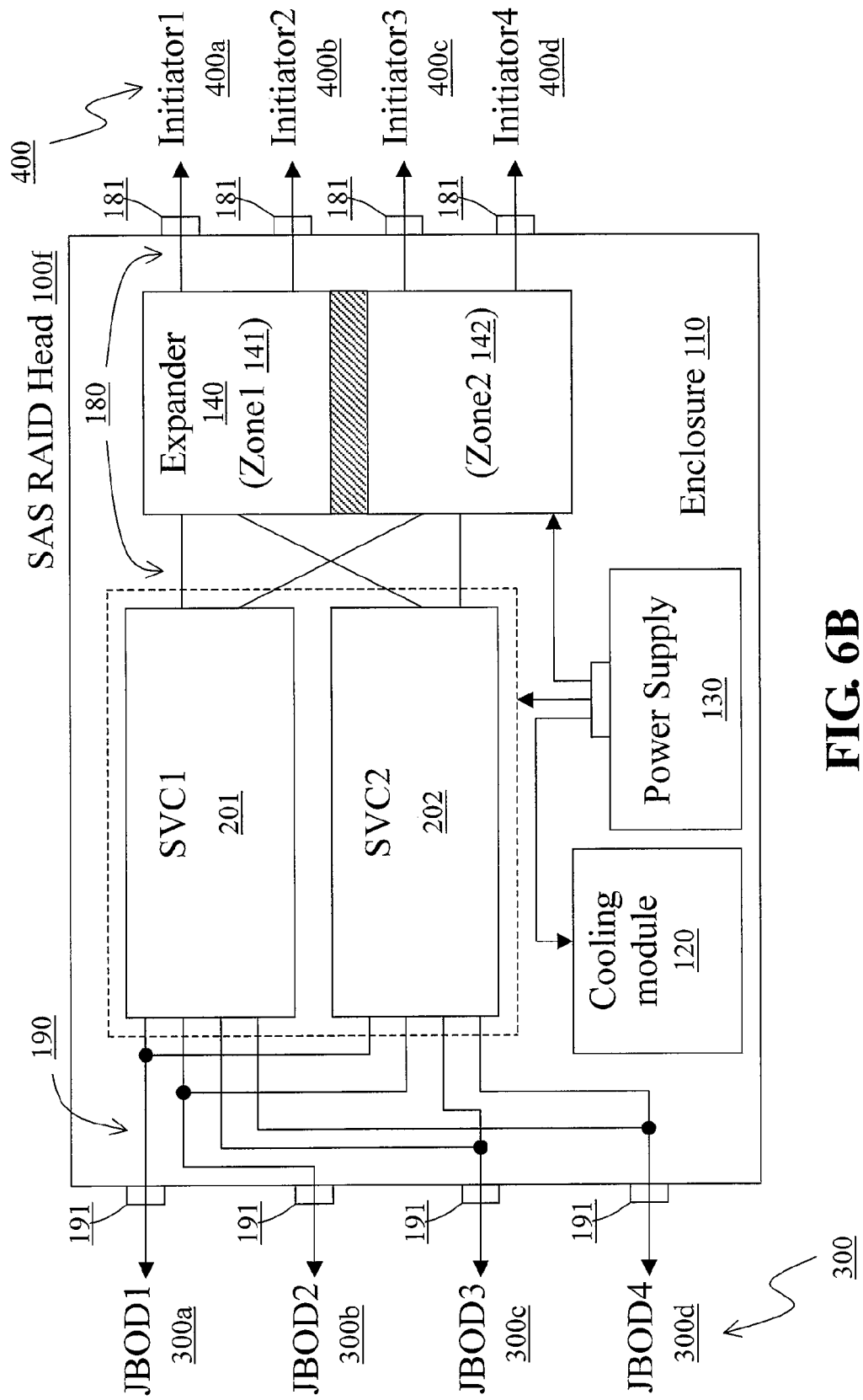
FIG. 6B shows the sixth embodiment of the disclosed SAS RAID head.

Please refer to FIGS. 6A and 6B. In consideration of practical applications, the RAID controller often needs to have the fault tolerance ability. Therefore, the invention arranges two SVCs 201, 202 in the SAS RAID heads 100e, 100f to form a redundant pair, called an SVC pair. The purpose of this arrangement is to let the two SVCs 201, 202 as each other's backup. That is, if one of the SVCs 201 or 202 malfunctions or fails, the other survival SVC 202 or 201 can maintain the normal operation, so that the host 400 can continuously access data without interruptions. How the SVCs 201, 202 in the SVC pair to take over each other's identity to achieve the fault tolerance effect is well known to people skilled in the art and therefore is not further described below.

Figure 13:
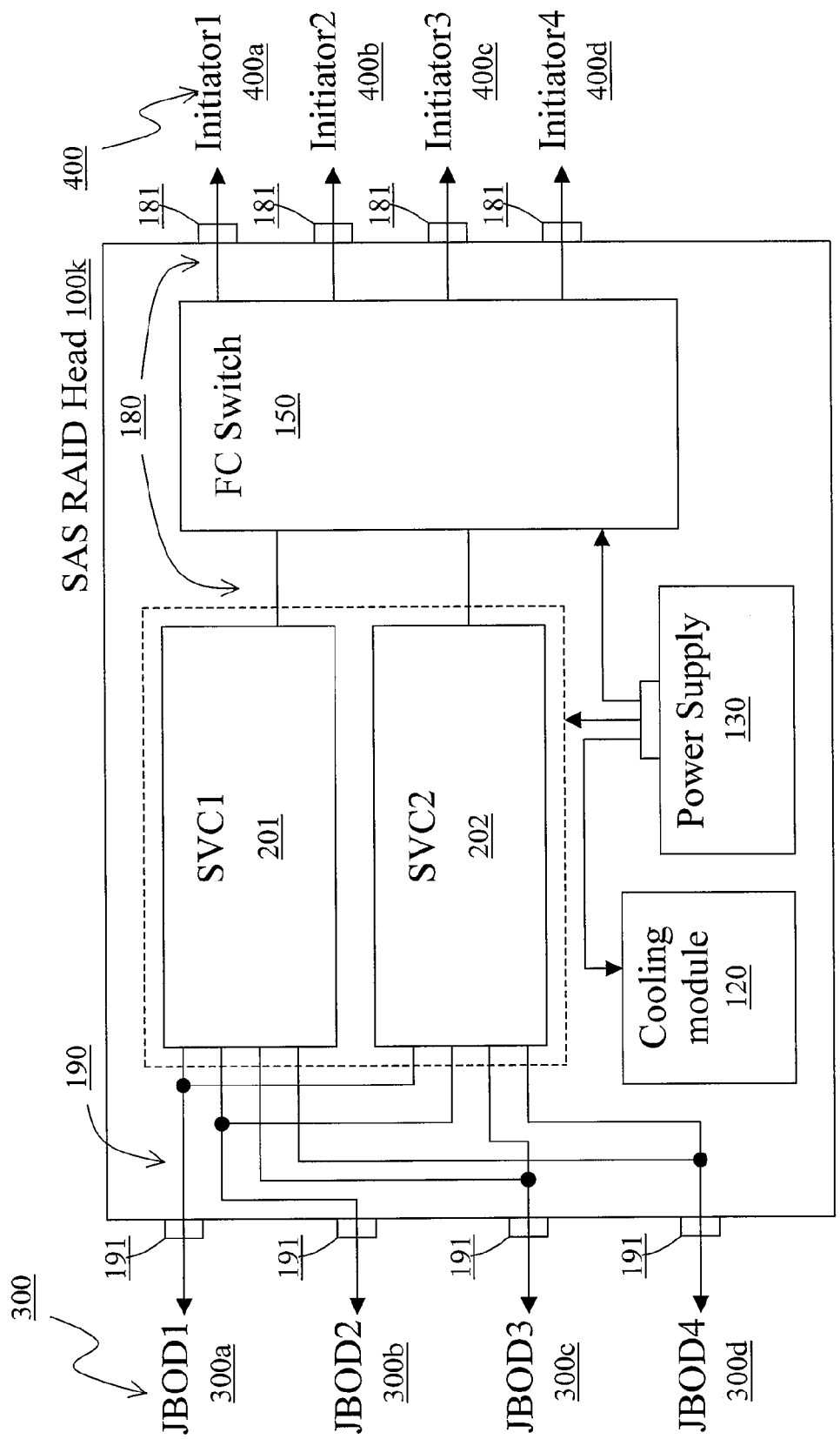
FIG. 13 shows the tenth embodiment of the disclosed SAS RAID head.

Although the SAS RAID heads 100e, 100f depicted in FIGS. 6A and 6B use the SAS protocol as an example for the host-side I/O device interconnect 180, in other embodiments one of other protocols such as the FC and SCSI can be selected to be the connection interface as well. The required components in other embodiments and the connection methods are analogous to those in FIGS. 3 and 4 described before. Suppose the host-side I/O device interconnect 180 is an FC. The functional blocks and connection relations of its SAS RAID head 100k are shown in FIG. 13. In order to simplify the drawings and explanation, the following drawings will take the SAS interface as an example for the host-side I/O device interconnect 180. As to other embodiments of using the FC or SCSI as the host-side I/O device interconnect 180, the details are analogous to the previously described embodiments. Therefore, such variations are not further described hereinafter.

When the host-side I/O device interconnect 180 is the SAS interface, at least one expander 140 needs to be inserted between the SVCs 201, 202 and the host 400 in order to provide a device expansion function. The SVCs 201, 202 thereby can connect to several initiators 400a, 400b, 400c, 400d. It should be noted that in different embodiments, the number and configuration of the inserted expanders 140 on the path of the host-side I/O device interconnect 180 are different. FIG. 6A shows the embodiment of a SVC pair in company with two expanders 140a, 140b. The host-side I/O device interconnect 180 is established between any two of the two SVCs 201, 202 and the two expanders 140a, 140b, forming two signal channels. Therefore, the signals sent out from the initiators 400a, 400b, 400c, 400d can access data on the JBOD1 300a, JBOD2 300b, JBOD3 300c, or JBOD4 300d individually via one of the two channels, under the control of the SVCs 201, 202. With reference to FIG. 6B, the two SVCs 201, 202 can also be connected with only one expander 140. However, the expander 140 is zoned into two zones, the first zone 141 and the second zone 142, to replace the roles placed by the two independent expanders 140a, 140b in FIG. 6A while at the same time achieving the same effects. In another embodiment, the expander 140 in FIG. 6B can also not be zoned into several zones (not shown), and the two SVCs 201, 202 can still achieve the objective of device expanding using the expander 140. As long as the initiators 400a, 400b, 400c, 400d can determine the channel from which the signals are received, the zoning may be discarded as well.

Generally speaking, in order to accord with the redundancy design of the SVC pair, each device-side interconnect port 191 in the SAS RAID heads 100e, 100f should establish an SAS interconnect 190 with the two SVCs 201, 202, respectively, to provide redundant transmission paths. With further reference to FIGS. 6A and 6B, each device-side interconnect port 191 in the drawings gathers the SAS interconnects 190 separately from the two SVCs 201, 202. Therefore, each external storage device 300a, 300b, 300c, 300d can achieve the necessary electrical connections with the SAS RAID heads 100e, 100f simply via a single device-side interconnect port 191. This can reduce the cost of the interconnect ports 191 and simplify the complexity of wire connections.

Figure 7:
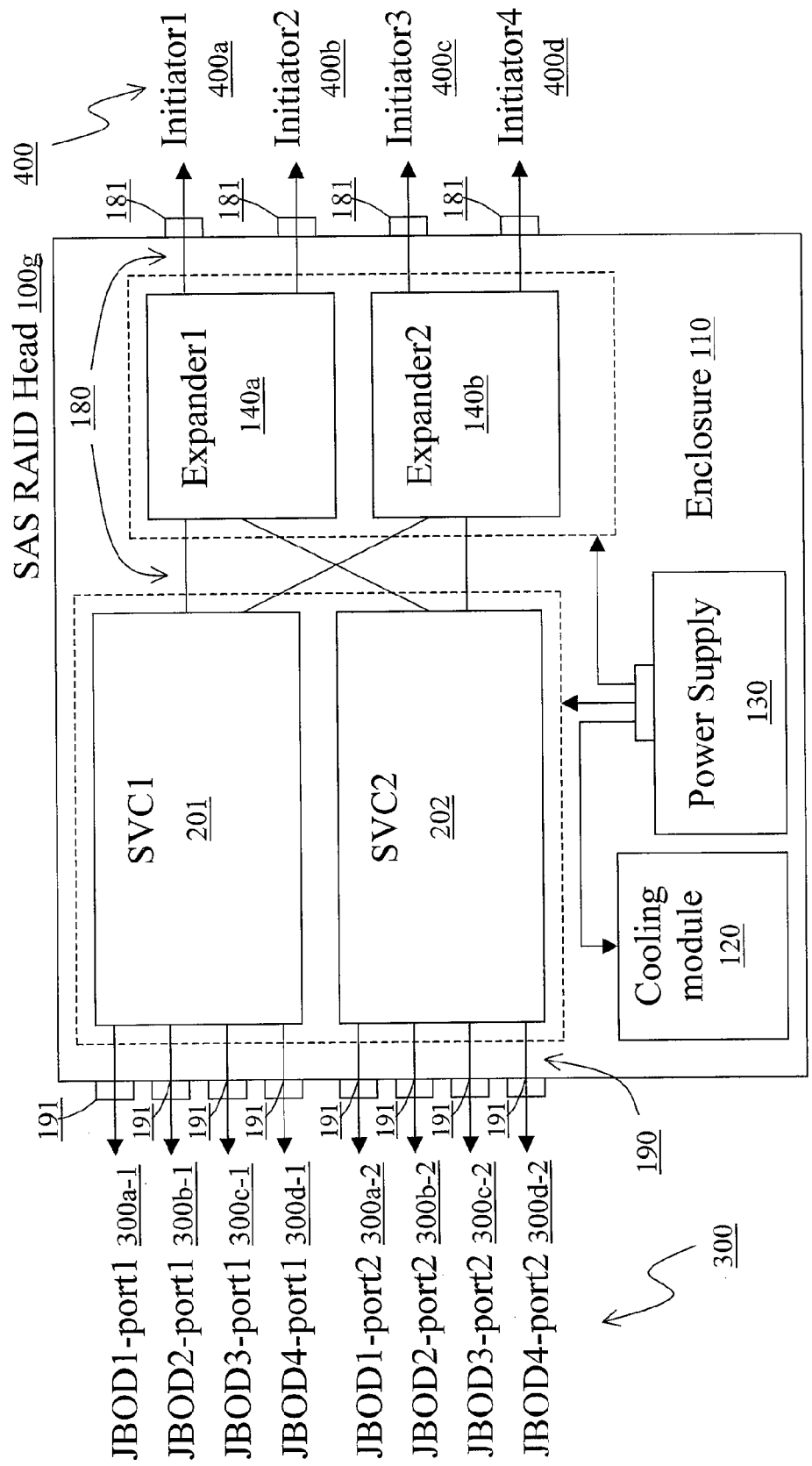
FIG. 7 shows another embodiment of the device-side interconnect port in the disclosed SAS RAID head.

Please refer to FIG. 7. In yet another embodiment of the invention, the SAS interconnects 190 from the two SVCs 201, 202 do not need to be gathered inside the SAS RAID head 100g. They are provided for external storage devices 300 directly via individual device-side interconnect ports 191. However, if the system operation still requires to dispose redundant connection paths on the device side, then the user has to individually connect the device-side interconnect ports 191 respectively corresponding to the two SVC 201, 202 to the interconnect ports of each storage device 300. For example, the first interconnect port 300a-1 of JBOD1 can be connected to the first interconnect port 191 provided by the SVC1 201, and the second interconnect port 300a-2 of JBOD1 to the first interconnect port 191 of the SVC2 202. Others are arranged in a similar way.

Figure 8:
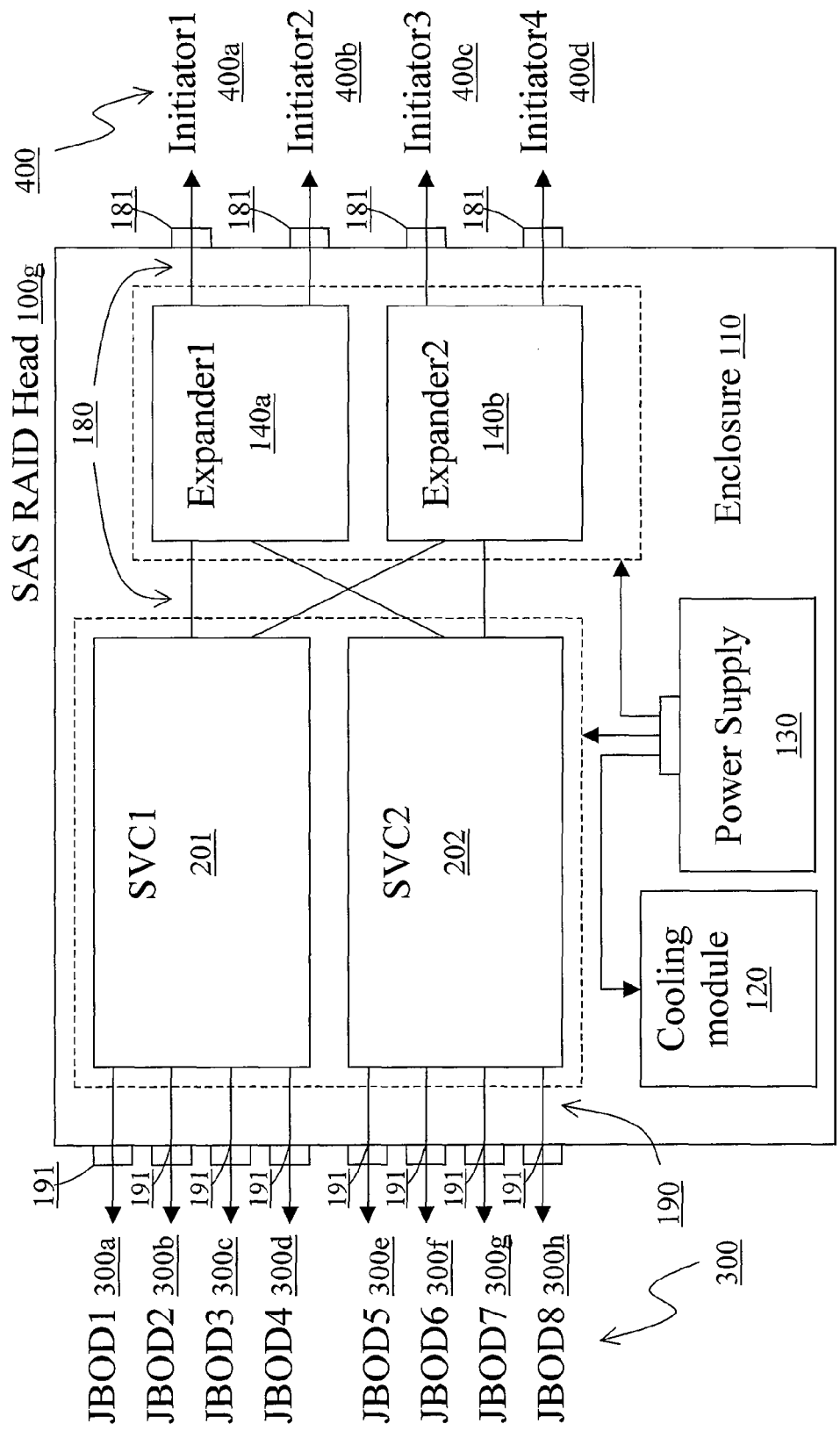
FIG. 8 shows another connection relation between the device-side interconnect port and the storage device in the disclosed SAS RAID head.

Please refer to FIG. 8. In practice, some or all of the device-side interconnect ports 191 provided by the two SVCs 201, 202 in the disclosed SAS RAID head 100g can be connected with different storage devices 300. For example, as shown in FIG. 8, the eight device-side interconnect ports 191 can be connected with eight different JBOD devices 300a, 300b, 300c, 300d, 300e, 300f, 300g, 300h. In this case, if the SAS interconnect 190 of one storage device 300 (e.g., JBOD1 300a) breaks, no redundant transmission path can be the substitute. As a result, none of the initiators 400a, 400b, 400c, 400d in the host 400 can access any data in JBOD1 300a.

Figure 9A:
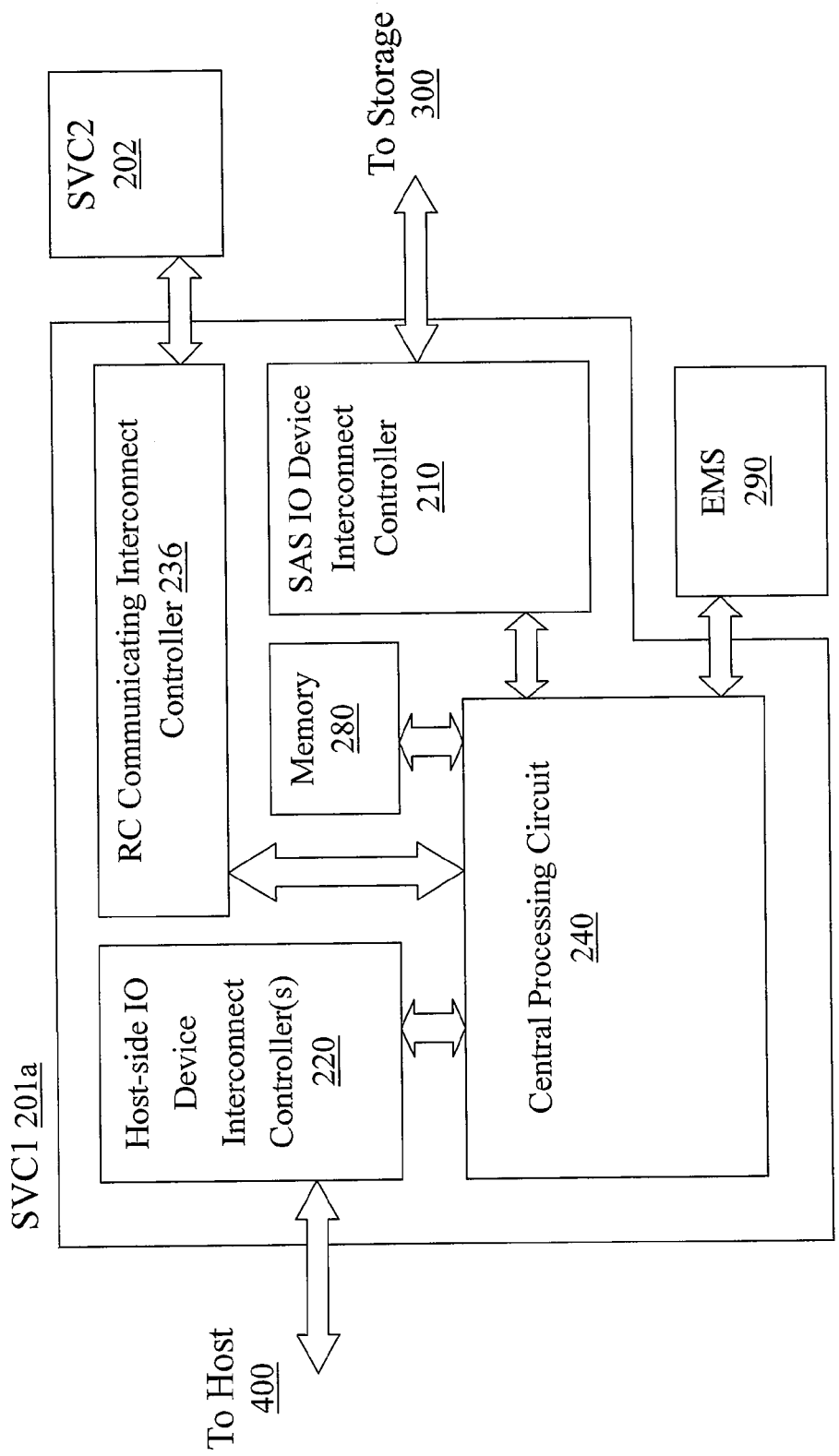
FIG. 9A shows the third embodiment of the SVC in the disclosed SAS RAID head.

FIG. 9A shows the functional block diagram of the SVC 201a according to an embodiment of the invention. The SVC 201a is used in the SAS RAID heads 100e, 100f, 100g, 100k which individually dispose an SVC pair according to the invention. The drawing also shows the connection relation between the first SVC 201a and the second SVC 202, the host 400, and the storage devices 300. In this embodiment, the SVC 201a comprises a host-side I/O device interconnect controller 220, a CPC 240, a memory 280, an SAS I/O device interconnect controller 210, and a redundant controller communicating (RCC) interconnect controller 236 (called a "RCC interconnect controller" for short hereinafter). Although the above-mentioned components are described using independent functional blocks, some or all of these functional blocks can be integrated into a single chip in practice. For example, it can use a design similar to FIG. 5B. The host-side I/O device interconnect controller 220 and the SAS I/O device interconnect controller 210 are integrated into an I/O device interconnect controller 230.

In comparison with the former embodiment, the components and effects of the SVC 201a in FIG. 9A are similar to the SVC 200a shown in FIG. 5A, except that one RCC interconnect controller 236, whose function is the interface between the CPC 240 and the second SVC 202, is involved in the SVC 201a. In this configuration, the redundant second SVC 202 can be attached to the SVC 201a, so that the storage devices 300 can be accessed by the two SVCs 201, 202. Furthermore, the control/data signals sent from the host 400 can be transmitted from the CPC 240 via the RCC interconnect controller 236 to the second SVC 202.

In one embodiment, the RCC interconnect controller 236 can be integrated with the host-side I/O device interconnect controller 220 into a single chip integrated circuit (IC) comprising several I/O ports, including one or multiple host-side ports and one or multiple device-side ports. In another embodiment, the RCC interconnect controller 236 can be integrated with the SAS I/O device interconnect controller 210 into a single chip IC. Furthermore, the host-side I/O device interconnect controller 220, the SAS I/O device interconnect controller 210, and the RCC interconnect controller 236 can all be integrated into a single chip IC. In this embodiment, the single chip I/O device interconnect controller contains I/O ports able to be the host-side ports, the device-side ports, and the I/O ports for connection between the SVCs 201 and 202.

Figure 9B:
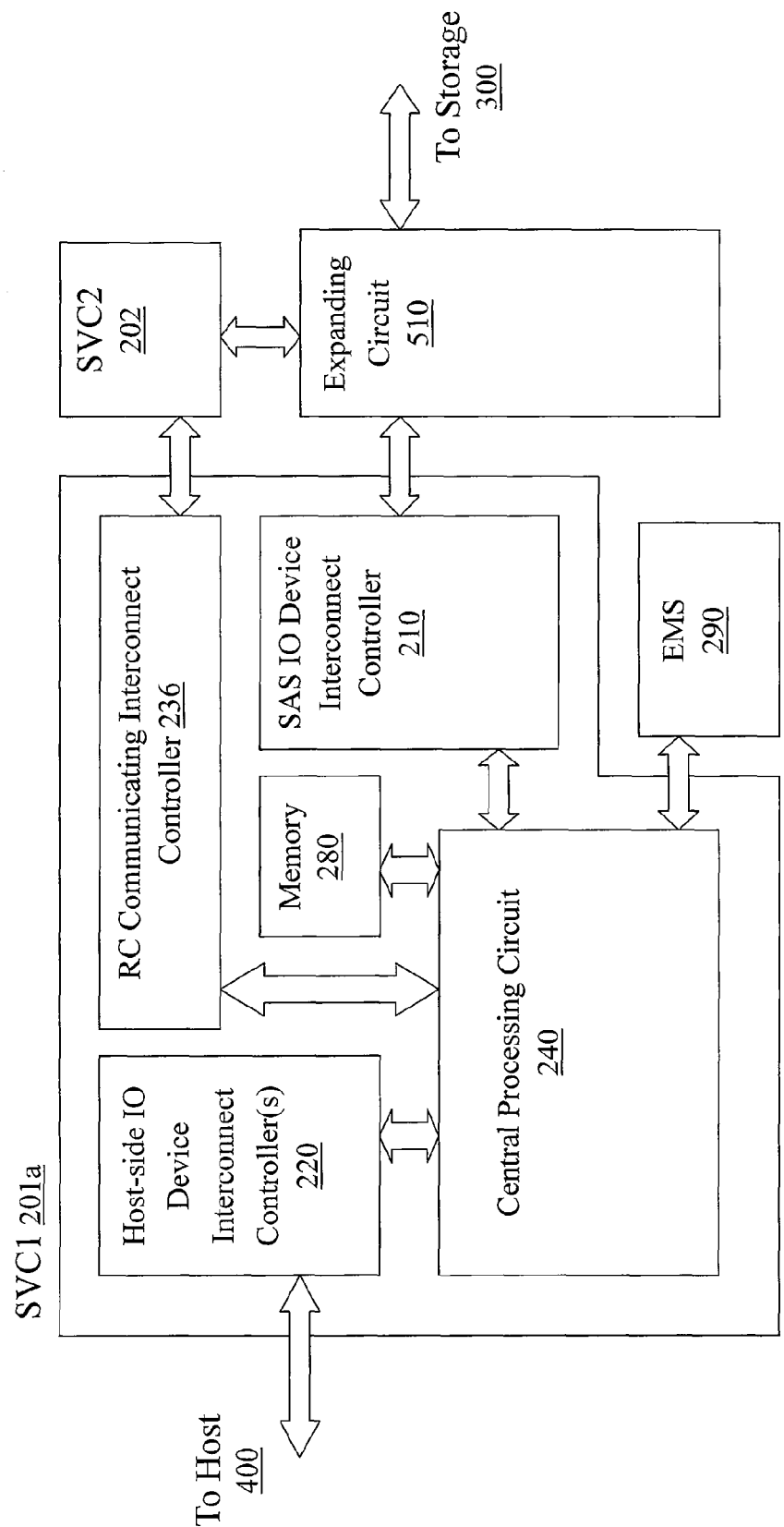
FIG. 9B shows the connection relation when an expanding circuit is inserted as the connection interface between the SVC, the storage device and the second SVC in FIG. 9A.

With reference to FIG. 9B, an expanding circuit 510 is further inserted between the SVC 201a and the storage devices 300, thereby expanding the number of device-side I/O device interconnect ports (not shown) of the SVC 201a. The second SVC 202 can also be connected with the expanding circuit 510 to expand the number of interconnect ports. Thus, the SAS RAID head 100 can connect with more external storage devices 300. Likewise, the SVCs 200a and 200b in FIGS. 5A and 5B can be connected to the storage devices 300 using an expanding circuit 510 (not shown). This also achieve the goal of expanding the device-side interconnect ports 191.

Figure 9C:
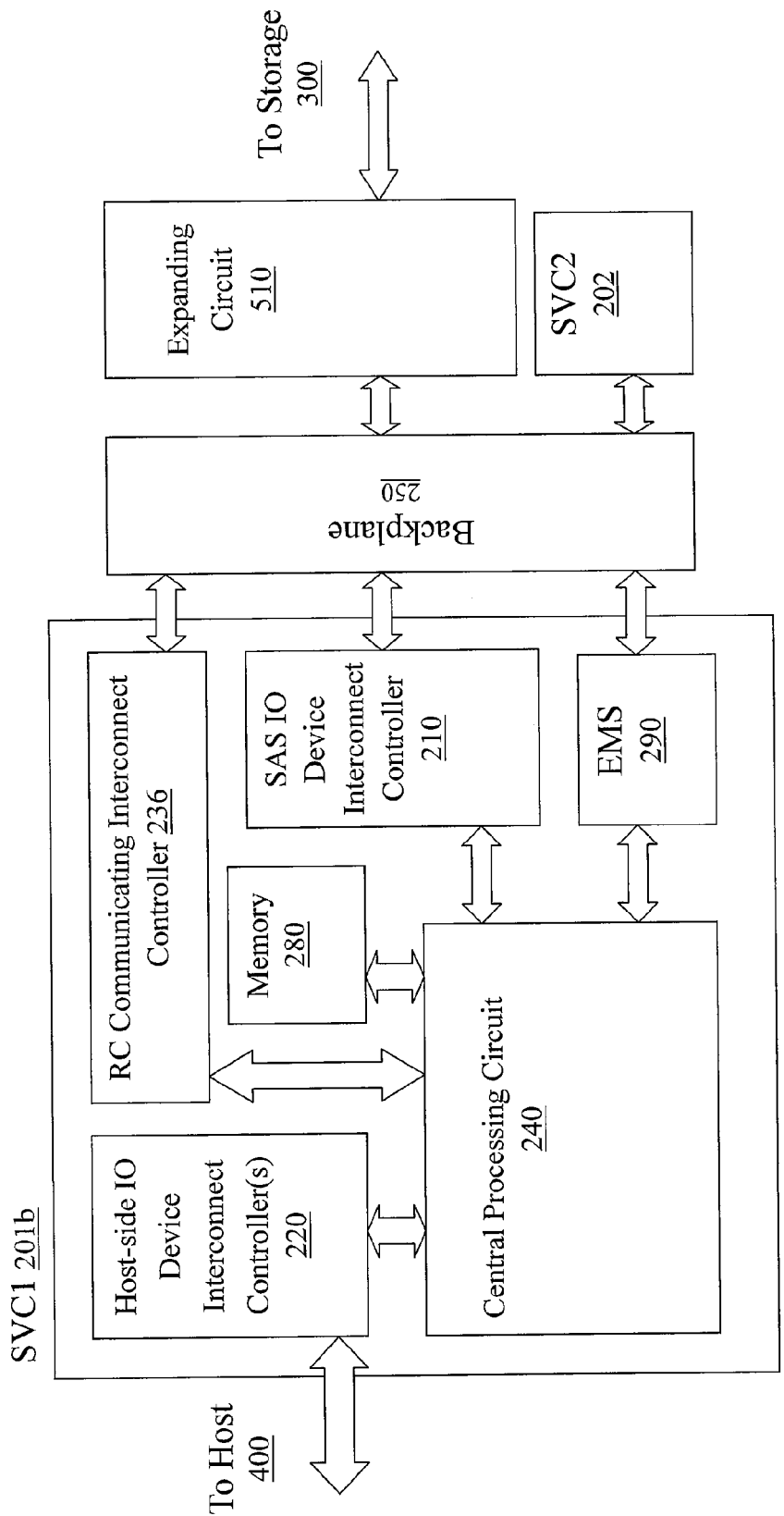
FIG. 9C shows the fourth embodiment of the SVC in the disclosed SAS RAID head, and the connection relation when a backplane and an expanding circuit is used as the connection interface between the SVC, the storage device and the second SVC.

FIG. 9C shows the functional blocks of the disclosed SVC 201b according to another embodiment. It also shows its connection with the host 400, to the storage device 300 via a backplane 250 and/or expanding circuit 510, and to the second SVC 202. In this embodiment, the SVC 201b includes a host-side I/O device interconnect controller 220, a CPC 240, a memory 280, an SAS I/O device interconnect controller 210, an RCC interconnect controller 236, and an EMS (enclosure management service) circuitry 290. Although the above-mentioned components are described using independent functional blocks, some or all of these functional blocks can be integrated into a single chip in practice. It should be noted that the expanding circuit 510 in FIG. 9C is an optional component as in FIGS. 9A and 9B. The disclosed SAS RAID heads 100e, 100f, 100g, 100j can be optionally added with an expanding circuit 510 as a connection interface to external storage devices 300, thereby providing more device-side interconnect ports 191 (not shown).

In comparison with the SVC 201a in FIG. 9B, the SAS I/O device interconnect controller 210 of the SVC 201b in FIG. 9C is connected via the backplane 250 to the expanding circuit 510 and then to the storage devices 300. The backplane 250 is a printed circuit board (PCB) that provides electrical power and communication links. It can be connected between the SVC 201b and the expanding circuit 510 for strengthening the connection. In the configuration of FIG. 9C, the physical electrical connection between the RCC interconnect controller 236 and the second SVC 202 is provided by the backplane 250. The physical electrical connection between the SAS I/O device interconnect controller 210 and the expanding circuit 510 is not necessarily implemented by the backplane 250. Instead, it can be directly achieved using a wire (e.g., a cable).

However, this method is nevertheless not as strong as using the backplane 250. Besides, the EMS circuitry 290 is provided inside the SVC 201b, not outside it.

The structure of the second SVC 202 in FIGS. 9A to 9C is basically the same as that of the first SVC 201. Its connection relation with the host 400 and the storage devices 300 is also the same as that between the first SVC 201 and the host 400 and the storage device 300 in FIGS. 9A to 9C. One only needs to interchange the roles played by the first SVC 201 and the second SVC 202.

In the embodiments of the SVCs 200, 201 shown in FIGS. 5A to 5B and FIGS. 9A to 9C, the host-side I/O device interconnect controller 220 and the SAS I/O device interconnect controller 210 can be implemented using the same type of IC chip. The configuration of the I/O device interconnect ports in the host-side I/O device interconnect controller 220 is set as the host-side I/O device interconnect ports. The configuration of the I/O device interconnect ports in the SAS I/O device interconnect controller 210 is set as the device-side I/O device interconnect ports. In another embodiment, a single chip can be set to include both the host-side I/O device interconnect ports and the device-side I/O device interconnect ports in order to simultaneously couple to the host 400 and the storage devices 300, respectively. Furthermore, the configuration of a single chip can be set to simultaneously include all the host-side I/O device interconnect ports for coupling to the host 400, all the device-side I/O device interconnect ports for coupling to the storage devices 300, and the interconnect port for coupling to the second SVC 202.

In yet another embodiment, the EMS circuitry 290 can be integrated into the CPC 240. Moreover, the EMS circuitry 290 can be implemented in the SAS I/O device interconnect controller 210.

Figure 10:
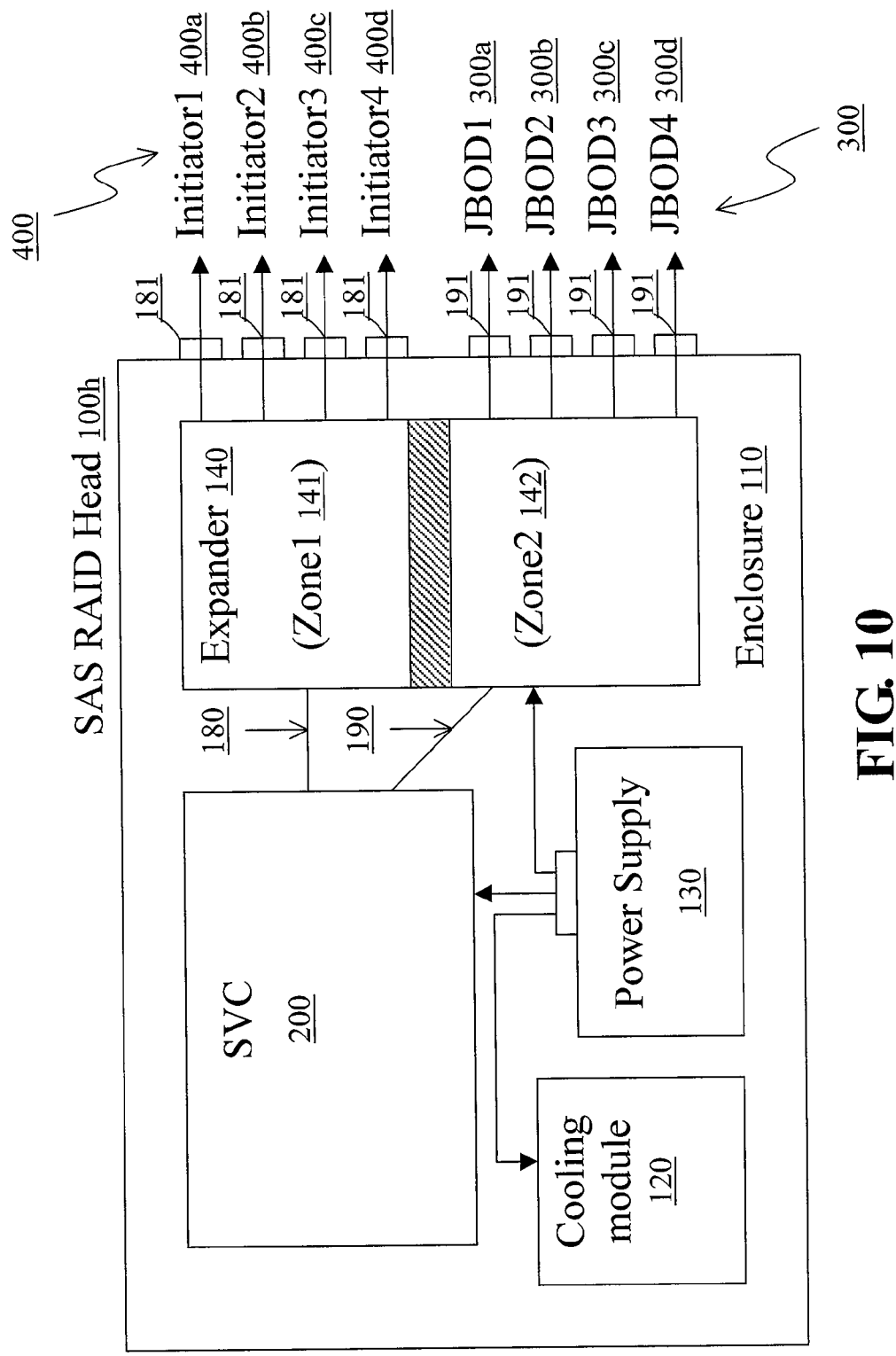
FIG. 10 shows the seventh embodiment of the disclosed SAS RAID head.

Please refer to FIG. 10. In another embodiment, the disclosed SAS RAID head 100h further uses an expander 140 being zoned into a plurality of zones by a zoning technique to connect with the host 400 and the storage devices 300. In the embodiment of the SAS RAID head 100h shown in the drawing, the expander 140 has two zones, Zone1 141 and Zone2 142. Zone1 141 is the connection interface with four initiators 400a, 400b, 400c, 400d. Zone2 142 is the connection interface with the storage devices 300. A host-side I/O device interconnect 180 is established between the SVC 200 and Zone1 141. An SAS I/O device interconnect 190 is established between the SVC 200 and Zone2 142. In another embodiment, the expander 140 is further divided into three or more zones. Each zone can be set for a dedicated connection to the host 400 or the storage devices 300. With reference to an embodiment of the SAS RAID head 100i shown in FIG. 11, its expander 140 has three zones: Zone1 141 as the connection interface with two initiators 400a and 400b, Zone2 142 as the connection interface with three JBODs 300a, 300b and 300c, and Zone3 143 as the connection interface with another two initiators 400c and 400d. Wherein, the SVC 200 individually establishes a host-side I/O device interconnect 180 with Zone1 141 and Zone3 143, and establishes an SAS I/O device interconnect 190 with Zone2 142.

Figure 11:
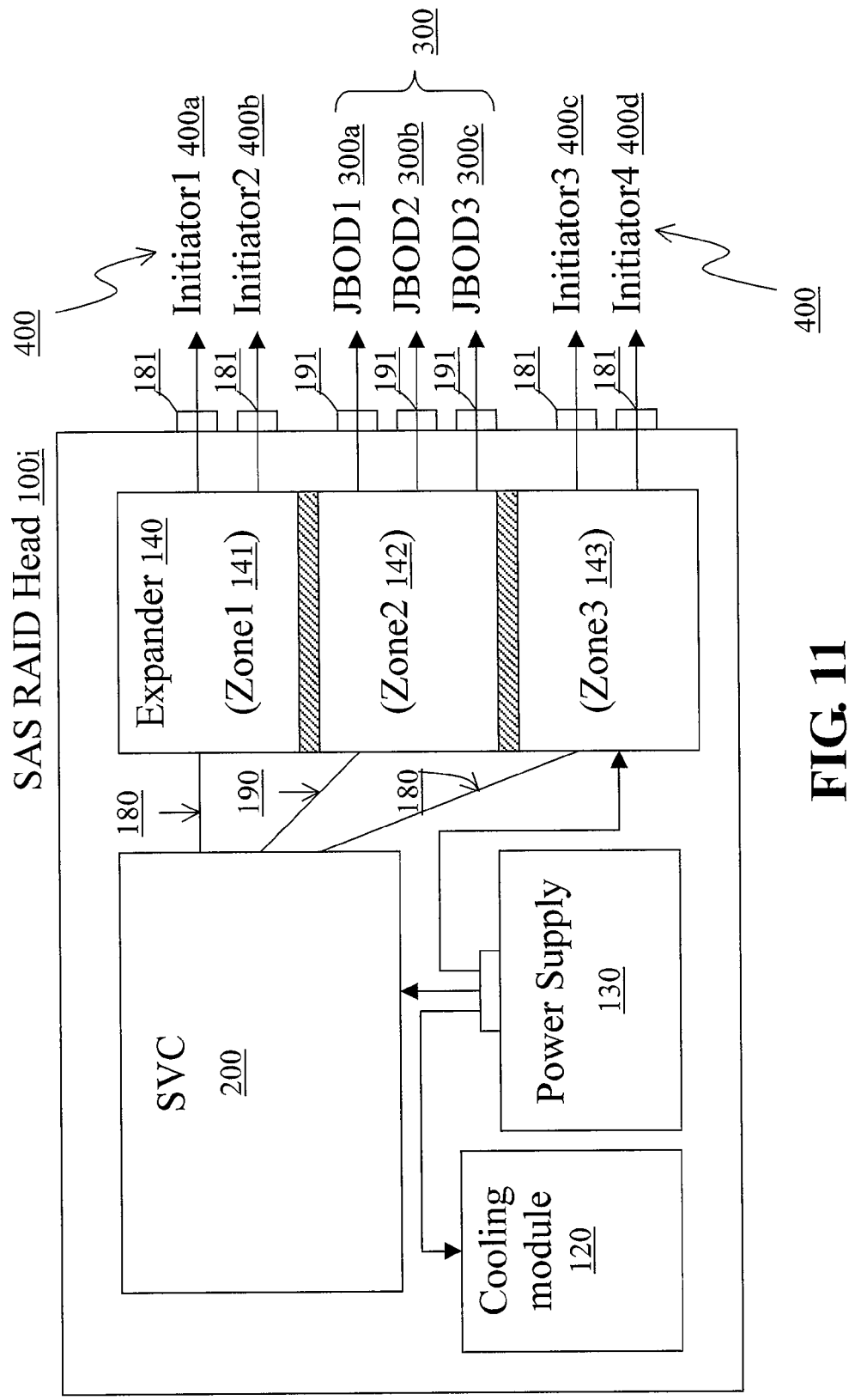
FIG. 11 shows the eighth embodiment of the disclosed SAS RAID head.
Figure 12:
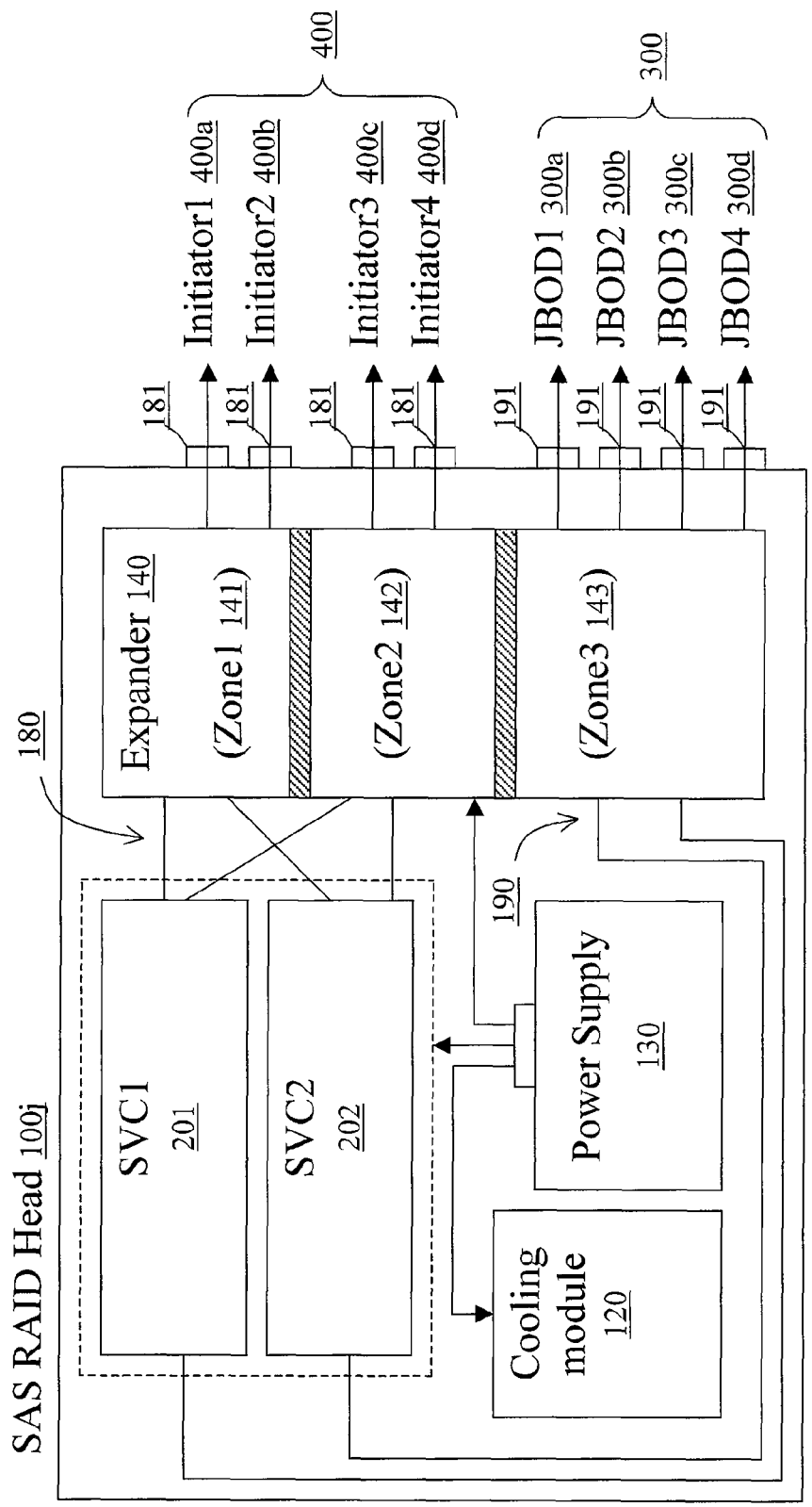
FIG. 12 shows the ninth embodiment of the disclosed SAS RAID head.

Furthermore, the concept of FIGS. 10 and 11 can also be implemented in the SAS RAID head 100j comprising an SVC pair shown in FIG. 12. The expander 140 shown in the drawing is zoned into three zones: Zone1 141 as the connection interface with two initiators 400a and 400b, Zone2 142 as the connection interface with another two initiators 400c and 400d, and Zone3 143 as the connection interface with the storage devices 300a, 300b, 300c and 300d. Wherein, the host-side I/O device interconnect 180 is established between any two of the SVC 201, 202 and Zone1 141 and Zone2. The SAS I/O device interconnect 190 is established between the SVC 201, 202 and Zone3 143, respectively.

In any embodiment of the disclosed SAS RAID head 100 mentioned above, the configuration of each or some of the I/O device interconnect ports in the SVC 200, 201, 202 can be flexibly set in the target mode or the initial mode, depending on demand. If set in the target mode, then the I/O device interconnect port is a host-side I/O device interconnect port that is electrically coupled to the host-side interconnect port 181 on the enclosure 110 for the connection with the host 400. If set in the initial mode, then the I/O device interconnect port is a device-side I/O device interconnect port that is electrically coupled to the device-side interconnect port 191 on the enclosure 110 for the connection with the storage devices 300. Therefore, the user can assign appropriate numbers of host-side interconnect ports 181 and device-side interconnect ports 191 according to different application requirements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A redundant array of independent disk (RAID) head whose device-side I/O device interconnect is a serial-attached small computer system interface (Serial-Attached SCSI) (hereinafter SAS RAID head), the SAS RAID head being disposed between at least one initiator and at least one storage device, the SAS RAID head comprising:

an enclosure;

a plurality of I/O device interconnect ports disposed on an exterior of the enclosure;

a first external storage virtualization controller (external SVC) disposed inside the enclosure, wherein one or more of the plurality of I/O device interconnect ports couple the first external SVC to the at least one initiator for executing at least one I/O operation in response to at least one I/O request sent out from the at least one initiator, wherein at least one of the plurality of I/O device interconnect ports is configurable in either a target mode or an initial mode and is selectively set in either the target mode or the initial mode, wherein in with regards to data read and/or data write commands, the target mode configures the I/O device interconnect port to only process the data read and/or data write commands passively received from the at least one initiator as a host-side I/O device interconnect port disposed on a path of a host-side I/O device interconnect for electrically coupling the first external SVC to the at least one initiator, and the initial mode configures the I/O device interconnect port to actively issue the data read and/or data write commands to connected devices as a device-side I/O device interconnect port disposed on a path of a device-side I/O device interconnect for electrically coupling the first external SVC to the storage device;

an expander circuitry, directly connected to the first external SVC and a second external SVC as well as directly connected to the at least one storage device, is divided into a plurality of zones, the plurality of zones including a first zone connected to at least one first initiator, a second zone connected to at least one second initiator, and a third zone connected to the at least one storage device; and a power supply unit coupled to the first external SVC for providing electrical power;

wherein the device-side I/O device interconnect of the first external SVC is a Serial-Attached SCSI (SAS) device-side I/O device interconnect; and wherein the enclosure has no internal space to accommodate a physical storage device (PSD) for storing payload data and the PSD is externally connected to the enclosure via one of the plurality of I/O device interconnect ports disposed on the exterior thereof.

2. The SAS RAID head of claim 1 further comprising a cooling module for removing heat from the first external SVC.

3. The SAS RAID head of claim 2, wherein the cooling module is a fan or a heat sink.

4. The SAS RAID head of claim 1, wherein the host-side I/O device interconnect is a SAS host-side I/O device interconnect.

5. The SAS RAID head of claim 1, wherein the SAS RAID head includes a host-side I/O device interconnect that is a Fibre Channel (FC) host-side I/O device interconnect.

6. The SAS RAID head of claim 1, wherein the SAS RAID head includes a host-side I/O device interconnect that is a SCSI host-side I/O device interconnect.

7. The SAS RAID head of claim 1, wherein each of the plurality of zones of the expander circuitry establish one or more of the host-side I/O device interconnects or the device-side I/O device interconnects with the first external SVC and the second external SVC.

8. The SAS RAID head of claim 1, wherein the first external SVC further includes:
   a central processing circuit (CPC) for executing the at least one I/O operation in response to the at least one I/O request sent out from the at least one initiator;
   an I/O device interconnect controller, coupled to the CPC, and to the at least one initiator and the at least one storage device via the plurality of I/O device interconnect ports, as an interface and buffer between the first external SVC and the at least one initiator and the at least one storage device; and
   a memory coupled to the CPC as a buffer for buffering data transmitted between the at least one initiator and the at least one storage device via the CPC.

9. The SAS RAID head of claim 8, wherein the I/O device interconnect controller further includes at least one SAS device-side I/O device interconnect port.

10. The SAS RAID head of claim 1, wherein the first external SVC further includes:
    a central processing circuit (CPC) for executing the at least one I/O operation in response to the at least one I/O request sent out from the at least one initiator;
    a host-side I/O device interconnect controller, coupled to the CPC, and to the at least one initiator or to the at least one initiator via the expander circuitry, as an interface and buffer between the first external SVC and the at least one initiator;
    a SAS I/O device interconnect controller coupled between the CPC and the at least one storage device as an interface and buffer between the first external SVC and the at least one storage device; and
    a memory coupled to the CPC as a buffer for buffering the data transmitted between the at least one initiator and the at least one storage device via the CPC.

11. The SAS RAID head of claim 10, wherein the SAS I/O device interconnect controller further includes at least one SAS device-side I/O device interconnect port.

12. The SAS RAID head of claim 1, wherein the first external SVC further includes:

a central processing circuit (CPC) for executing the at least one I/O operation in response to the at least one I/O request sent out from the at least one initiator;
at least one I/O device interconnect controller coupled to the CPC;
at least one host-side I/O device interconnect port, disposed in one of the at least one I/O device interconnect controller for coupling to the initiator; and
at least one device-side I/O device interconnect port, disposed in one of the at least one I/O device interconnect controllers for coupling to the at least one storage device via SAS protocol.

13. The SAS RAID head of claim 12, wherein one of the host-side I/O device interconnect ports and one of the device-side I/O device interconnect ports are disposed in the same I/O device interconnect controller.

14. The SAS RAID head of claim 12, wherein one of the host-side I/O device interconnect ports and one of the device-side I/O device interconnect ports are disposed in different ones of the I/O device interconnect controllers.

15. The SAS RAID head of claim 8, 10 or 12, wherein an enclosure management service (EMS) circuitry is attached to the CPC for managing one or more of a cooling module and the power supply unit.

16. The SAS RAID head of claim 1 further comprising a backplane coupled to the first external SVC for fixing the SVC and providing communication links.

17. The SAS RAID head of claim 1, wherein the second external SVC is disposed inside the enclosure and associated with the first external SVC to form a SVC pair, wherein one or more of the plurality of I/O device interconnect ports couple the second external SVC to the at least one initiator for executing at least one I/O operation in response to at least one I/O request sent out from the at least one initiator, wherein at least one of the I/O device interconnect ports that couple the second external SVC to the at least one initiator is configurable in both the target mode and the initial mode and is selectively set in either the target mode or the initial mode, and wherein a device-side I/O device interconnect of the second external SVC is the Serial-Attached SCSI (SAS) device-side I/O device interconnect.

18. The SAS RAID head of claim 17 further comprising a cooling module for removing heat from the SVC pair.

19. The SAS RAID head of claim 18, wherein the cooling module is a fan or a heat sink.

20. The SAS RAID head of claim 17, wherein when the configurations of one or more of the I/O device interconnect ports are set in the initial mode, the one or more of the I/O device interconnect ports set in the initial mode are configured as device-side I/O device interconnect ports disposed on the path of the device-side I/O device interconnect electrically coupling the SVC pair to the at least one storage device.

21. The SAS RAID head of claim 17, wherein the plurality of I/O device interconnect ports include at least one device-side interconnect port that collects the device-side I/O device interconnects individually from the first external SVC and the second external SVC for electrically coupling the SVC pair to the at least one storage device.

22. The SAS RAID head of claim 17, wherein the plurality of I/O device interconnect ports include at least one device-side interconnect port individually connected to the device-side I/O device interconnect of the first external SVC or the second external SVC for connection with the at least one storage device.

23. The SAS RAID head of claim 1, wherein the expander circuitry is an expander when the host-side I/O device interconnect is a SAS host-side I/O device interconnect.

24. The SAS RAID head of claim 1, wherein the expander circuitry comprises a plurality of expanders each of which establishes the host-side I/O device interconnects with the first external SVC and the second external SVC, respectively, forming a plurality of signal transmission channels.

25. The SAS RAID head of claim 17, wherein the first external SVC further includes:
a central processing circuit (CPC) for executing the at least one I/O operation in response to the at least one I/O request sent out from the at least one initiator;
a redundant controller communicating (RCC) interconnect controller coupled between the CPC and the second external SVC of the SVC pair;
an I/O device interconnect controller, coupled to the CPC, and to the initiator and to the at least one storage device via the plurality of I/O device interconnect ports, as an interface and buffer between the first external SVC and the at least one initiator and the at least one storage device; and
a memory coupled to the CPC as a buffer for buffering the data transmitted between the at least one initiator and the at least one storage device via the CPC.

26. The SAS RAID head of claim 25, wherein the I/O device interconnect controller further includes at least one SAS device-side I/O device interconnect port.

27. The SAS RAID head of claim 17, wherein the first external SVC further includes:
a central processing circuit (CPC) for executing the at least one I/O operation in response to the at least one I/O request sent out from the at least one initiator;
a redundant controller communicating (RCC) interconnect controller coupled between the CPC and the second external SVC of the SVC pair;
a host-side I/O device interconnect controller, coupled to the CPC, and to the at least one initiator or to the at least one initiator via the expander circuitry, as an interface and buffer between the first external SVC and the at least one initiator;
a SAS I/O device interconnect controller coupled between the CPC and the at least one storage device as an interface and buffer between the first external SVC and the at least one storage device; and
a memory coupled to the CPC as a buffer for buffering the data transmitted between the at least one initiator and the storage device via the CPC.

28. The SAS RAID head of claim 27, wherein the SAS I/O device interconnect controller further includes at least one SAS device-side I/O device interconnect port.

29. The SAS RAID head of claim 17, wherein the first external SVC further includes:
a central processing circuit (CPC) for executing the at least one I/O operation in response to the at least one I/O request sent out from the at least one initiator;
at least one I/O device interconnect controller coupled to the CPC;
at least one host-side I/O device interconnect port disposed in one of the I/O device interconnect controllers for coupling to the at least one initiator; and
at least one device-side I/O device interconnect port disposed in one of the I/O device interconnect controllers for coupling to the at least one storage device via SAS protocol.

30. The SAS RAID head of claim 29, wherein one of the host-side I/O device interconnect ports and one of the device-side I/O device interconnect ports are disposed in the same I/O device interconnect controller.

31. The SAS RAID head of claim 29, wherein one of the host-side I/O device interconnect ports and one of the device-side I/O device interconnect ports are disposed in different ones of the I/O device interconnect controllers.

32. The SAS RAID head of claim 25, 27 or 29, wherein an enclosure management service (EMS) circuitry is attached to the CPC for managing one or more of a cooling module and the power supply unit.

33. The SAS RAID head of claim 25, wherein the expander circuitry is coupled to the I/O device interconnect controller in the first external SVC and to the second external SVC for expanding devices.

34. The SAS RAID head of claim 27, wherein the expander circuitry is coupled to the SAS I/O device interconnect controller in the first external SVC and to the second external SVC for expanding devices.

35. The SAS RAID head of claim 29, wherein the expander circuitry is coupled to the at least one I/O device interconnect controller in the first external SVC and to the external second SVC for expanding devices.

36. The SAS RAID head of claim 33 further comprising a backplane coupled between the I/O device interconnect controller in the first external SVC and the second external SVC and the expander circuitry for fixing the first and second external SVCs and providing communication links.

37. The SAS RAID head of claim 34 further comprising a backplane coupled between the SAS I/O device interconnect controller in the first external SVC and the second external SVC and the expander circuitry for fixing the first and second external SVCs and providing communication links.

38. The SAS RAID head of claim 35 further comprising a backplane coupled between the at least one I/O device interconnect controller in the first external SVC and the second external SVC and the expander circuitry for fixing the first and second external SVCs and providing communication links.

39. The SAS RAID head of claim 25 further comprising a backplane coupled to the I/O device interconnect controller in the first external SVC and to the second external SVC for fixing the first and second external SVCs and providing communication links.

40. The SAS RAID head of claim 27 further comprising a backplane coupled to the SAS I/O device interconnect controller in the first external SVC and to the second external SVC for fixing the first and second external SVCs and providing communication links.

41. The SAS RAID head of claim 29 further comprising a backplane coupled to the at least one I/O device interconnect controller in the first external SVC and to the second external SVC for fixing the first and second external SVCs and providing communication links.

42. The SAS RAID head of claim 17 further comprising a backplane coupled to the SVC pair for fixing the SVC pair and providing communication links.

43. The SAS RAID head of claim 1, wherein a subset of the plurality of I/O device interconnect ports include at least a first I/O device interconnect port set in the target mode and a second I/O device interconnect port set in the initial mode.

44. A method for controlling a redundant array of independent disk (RAID) head having a serial-attached small computer system interface (Serial-Attached SCSI), comprising:
connecting at least one initiator to the RAID head via a first I/O device interconnect port disposed on an exterior of an enclosure of the RAID head;
connecting at least one physical storage device (PSD) to the RAID head via a second I/O device interconnect port disposed on the exterior of the enclosure of the RAID head, wherein the enclosure has no internal space to accommodate the PSD;

configuring the first I/O device interconnect port and the second I/O device interconnect port, wherein the first and second I/O device interconnect ports are configurable in either a target mode or an initial mode and are selectively set in either the target mode or the initial mode, and wherein configuring the first I/O device interconnect port and the second I/O device interconnect port comprises:

setting the first I/O device interconnect port in the target mode, wherein with regards to data read and/or data write commands, setting the first I/O device interconnect port in the target mode configures the first I/O device interconnect port to only process the data read and/or data write commands from the at least one initiator as a host-side I/O device interconnect port disposed on a path of a host-side I/O device interconnect for electrically coupling the at least one initiator to a first storage virtualization controller (SVC) disposed inside the enclosure; and setting the second I/O device interconnect port in the initial mode, wherein with regards to data read and/or data write commands, setting the second I/O device interconnect port in the initial mode configures the second I/O device interconnect port to actively issue the data read and/or data write commands to connected devices as a device-side I/O device interconnect port disposed on a path of a device-side I/O device interconnect for electrically coupling the first SVC to the PSD; and executing at least one I/O operation using the first SVC in response to at least one I/O request from the at least one initiator, wherein the SVC receives the at least one I/O request from the at least one initiator via the first I/O device interconnect port configured as the host-side I/O device interconnect port;

wherein an expander circuitry, directly connected to the first SVC and a second SVC as well as directly connected to at least one storage device, is divided into a plurality of zones, the plurality of zones including a first zone respectively connected to at least one first initiator, a second zone respectively connected to at least one second initiator, and a third zone respectively connected to the at least one storage device.

45. The method of claim 44, further comprising providing electrical power to the RAID head via a power supply unit.

46. The method of claim 44, wherein executing the at least one I/O operation using the first SVC comprises internally mapping signals associated with the I/O request received from the at least one initiator to the PSD.

47. The method of claim 44, wherein the at least one I/O request from the at least one initiator comprises a read request.

48. The method of claim 47, wherein executing the at least one I/O operation using the SVC comprises:
obtaining data associated with the read request from the PSD via the second I/O device interconnect port configured as the device-side I/O device interconnect port; and
transferring the obtained data to the at least one initiator via the first I/O device interconnect port configured as the host-side I/O device interconnect port.

49. The method of claim 44, wherein the at least one I/O request from the at least one initiator comprises a write request.

50. The method of claim 49, wherein executing the at least one I/O operation using the SVC comprises:
receiving data associated with the write request from the at least one initiator via the first I/O device interconnect port configured as the host-side I/O device interconnect port;
transmitting an I/O complete response to the at least one initiator via the first I/O device interconnect port configured as the host-side I/O device interconnect port; and
writing the data associated with the write request to the PSD via the second I/O device interconnect port configured as the device-side I/O device interconnect port.

51. The method of claim 50, wherein the first SVC transmits the I/O complete response to the at least one initiator prior to writing the data associated with the write request to the PSD in response to the first SVC having a write back configuration.

52. The method of claim 50, wherein the first SVC transmits the I/O complete response to the at least one initiator subsequent to writing the data associated with the write request to the PSD in response to the first SVC having a write through configuration.

53. The method of claim 44, wherein:
the plurality of zones of the expander circuitry establish one or more of the host-side I/O device interconnects or the device-side I/O device interconnects with the first SVC and the second SVC.

54. The method of claim 44, further comprising:
determining that the first SVC has malfunctioned or failed; and
assigning an identity associated with the first SVC to the second SVC to provide a fault tolerance function.

55. A redundant array of independent disk (RAID) head having a serial-attached small computer system interface (Serial-Attached SCSI), comprising:
an enclosure having no internal space to accommodate a physical storage device (PSD);
a plurality of I/O device interconnect ports disposed on an exterior of the enclosure, wherein at least one of the plurality of I/O device interconnect ports is configurable in either a target mode or an initial mode and is selectively set in either the target mode or the initial mode;
a first storage virtualization controller (SVC) disposed inside the enclosure, wherein setting one or more of the plurality of I/O device interconnect ports in the target mode, with regards to data read and/or data write commands, configures the one or more I/O device interconnect ports to only process the data read and/or data write commands passively received from at least one initiator as host-side I/O device interconnect ports disposed on a path of a host-side I/O device interconnect for electrically coupling the at least one initiator to the first SVC, and setting one or more of the plurality of I/O device interconnect ports in the initial mode configures the one or more I/O device interconnect ports to actively issue the data read and/or data write commands to connected devices as device-side I/O device interconnect ports disposed on a path of a device-side I/O device interconnect for electrically coupling the first SVC to the physical storage device (PSD); and
an expander circuitry, directly connected to the first SVC and a second SVC as well as directly connected to at least one storage device, is divided into a plurality of zones, the plurality of zones including a first zone respectively connected to at least one first initiator, a second zone respectively connected to at least one second initiator, and a third zone respectively connected to the at least one storage device.

56. The SAS RAID head of claim 1, wherein the plurality of I/O device interconnect ports are each configurable in both the target mode and the initial mode and selectively set in either the target mode or the initial mode.

57. The method of claim 44, wherein the RAID head comprises a plurality of I/O device interconnect ports, including at least the first I/O device interconnect port and the second I/O device interconnect port, and wherein the plurality of I/O device interconnect ports are each configurable in both the target mode and the initial mode and selectively set in either the target mode or the initial mode.

58. The RAID head of claim 55, wherein the plurality of I/O device interconnect ports are each configurable in both the target mode and the initial mode and selectively set in either the target mode or the initial mode.

* * * * *